United States Patent
Michaelson et al.

(10) Patent No.: US 12,361,467 B2
(45) Date of Patent: Jul. 15, 2025

(54) SYSTEM FOR PERSONALIZED RECOMMENDATIONS

(71) Applicant: Wynshop Enterprises Inc., Fort Lauderdale, FL (US)

(72) Inventors: Henry Miller Michaelson, Studio City, CA (US); Frederick Lafayette Columbus Wedgeworth, III, Scottsdale, AZ (US); Gabriel Alvaro Nipote, Burbank, CA (US); Spencer Harrison Price, Sherman Oaks, CA (US)

(73) Assignee: WYNSHOP ENTERPRISES INC., Fort Lauderdale, FL (US)

( * ) Notice: Subject to any disclaimer, the term of this patent is extended or adjusted under 35 U.S.C. 154(b) by 364 days.

(21) Appl. No.: 17/030,237

(22) Filed: Sep. 23, 2020

(65) Prior Publication Data
US 2021/0090154 A1    Mar. 25, 2021

Related U.S. Application Data

(60) Provisional application No. 62/905,963, filed on Sep. 25, 2019.

(51) Int. Cl.
*G06Q 30/0601* (2023.01)
*G06F 16/9035* (2019.01)
(Continued)

(52) U.S. Cl.
CPC ..... *G06Q 30/0631* (2013.01); *G06F 16/9035* (2019.01); *G06F 16/951* (2019.01);
(Continued)

(58) Field of Classification Search
CPC .... G06F 16/335; G06F 16/35; G06F 16/9035; G06F 16/951; G06F 16/9535;
(Continued)

(56) References Cited

U.S. PATENT DOCUMENTS 8,364,528 B2    1/2013  Selinger et al.
9,165,320 B1 *  10/2015 Belvin ............... G06Q 30/0633
(Continued)

FOREIGN PATENT DOCUMENTS

WO    WO-2010051642 A1 *  5/2010  ............... G06N 5/02

OTHER PUBLICATIONS

Z. Davis, M. Hu, S. Prasad, M. Schuricht, P. M. Melliar-Smith and L. E. Moser, "A Personal Handheld Multi-Modal Shopping Assistant," International conference on Networking and Services (ICNS'06), Silicon Valley, CA, USA, 2006, 9pp. (Year: 2006).*

(Continued)

*Primary Examiner* — Adam L Levine
(74) *Attorney, Agent, or Firm* — Fenwick & West LLP

(57) ABSTRACT

Techniques for intelligently predicting which items a user will add to an electronic shopping cart are disclosed. An item is added to an electronic shopping cart of a user. Natural language processing (NLP) determines a general product category and supporting product details of the item. The general product category and the supporting product details are used as parameters in a query executed against a database, which links the item to other items based on shared characteristics between the item and those other items. A result of the query identifies those linked items. Based on an identified characteristic associated with the user, the items included in the query result are filtered to generate a list of proposed items for potential inclusion in the electronic shopping cart. This list is displayed to the user.

13 Claims, 16 Drawing Sheets

1300

In Response To A Second Item Being Added To The Electronic Shopping Cart, Use The Database To Identify A Recipe Comprising The Item And The Second Item — 1330

Based On The Identified Recipe, Modify The List Of Proposed Items To Include Remaining Items That Are Included In The Identified Recipe — 1335

Display The Modified List Of Proposed Items To The User — 1340

(51) Int. Cl.
*G06F 16/951* (2019.01)
*G06F 16/955* (2019.01)
*G06F 40/205* (2020.01)
*G06F 40/40* (2020.01)

(52) U.S. Cl.
CPC ........ *G06F 16/9558* (2019.01); *G06F 40/205* (2020.01); *G06F 40/40* (2020.01); *G06Q 30/0643* (2013.01)

(58) Field of Classification Search
CPC .... G06F 16/9558; G06F 40/205; G06F 40/30; G06F 40/40; G06Q 30/06–0645; G06Q 30/08; G06Q 50/01; G16Y 10/00–90
See application file for complete search history.

(56) References Cited

U.S. PATENT DOCUMENTS

| | | | |
|---|---|---|---|
| 10,269,021 B2 * | 4/2019 | Levy | G06Q 30/0623 |
| 10,417,688 B2 * | 9/2019 | Caster | G06F 16/9535 |
| 11,315,164 B2 * | 4/2022 | Bhattacharjee | G06N 3/08 |
| 2002/0019763 A1 | 2/2002 | Linden et al. | |
| 2015/0088692 A1 * | 3/2015 | Fung | G06Q 30/0623 |
| | | | 705/26.61 |
| 2017/0024478 A1 | 1/2017 | Garg et al. | |

OTHER PUBLICATIONS

International Search Report and Written Opinion received for PCT Patent Application No. PCT/US2020/052552, mailed on Jan. 5, 2021, 9 pages.

* cited by examiner

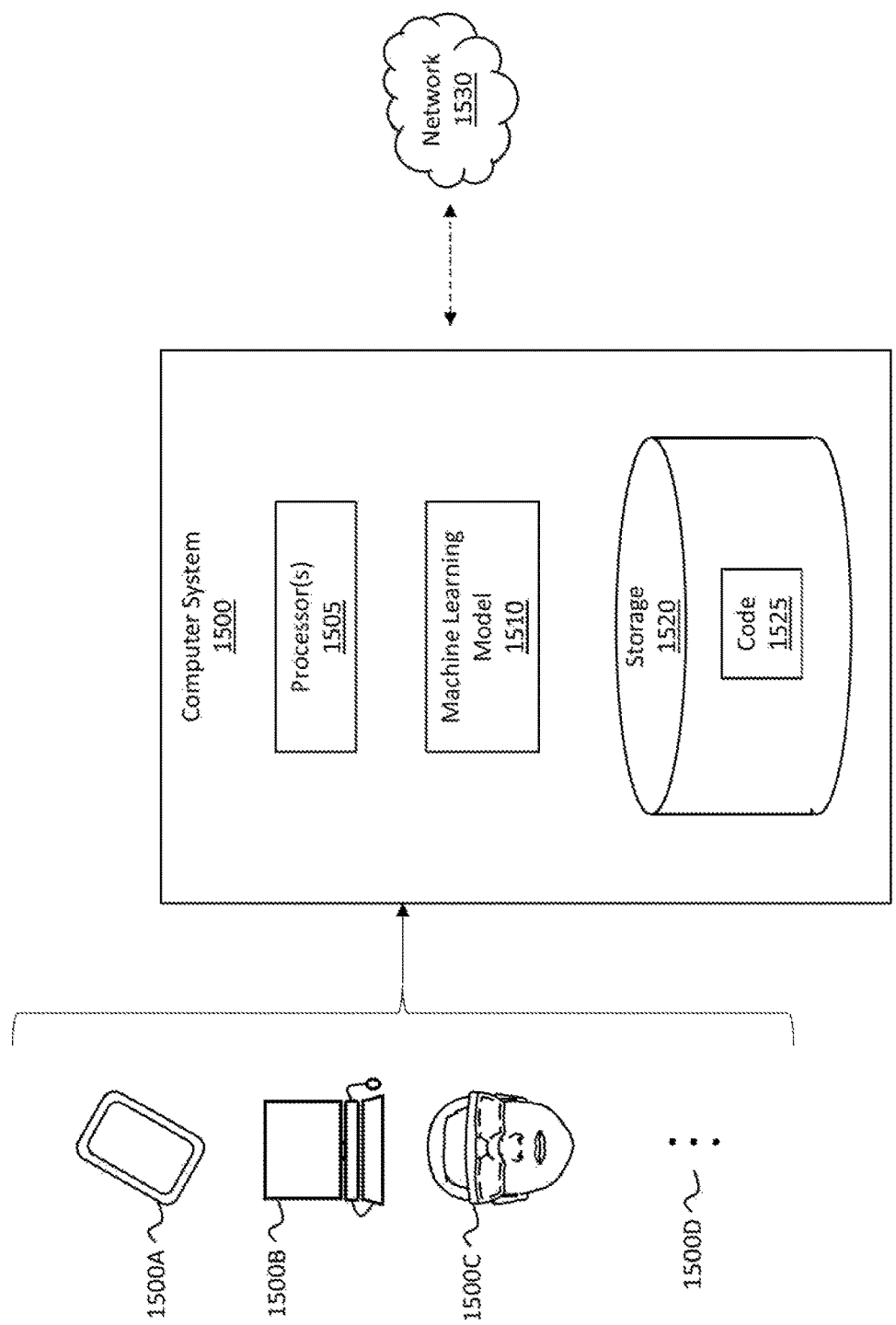

SYSTEM FOR PERSONALIZED RECOMMENDATIONS

CROSS-REFERENCE TO RELATED APPLICATIONS

This application claims the benefit of and priority to U.S. Provisional Patent Application Ser. No. 62/905,963 filed on Sep. 25, 2019 and entitled "SYSTEM FOR PERSONALIZED FOOD RECOMMENDATIONS," which application is expressly incorporated herein by reference in its entirety.

BACKGROUND

Computers and computing systems have affected nearly every aspect of modern living. Computers are generally involved in work, recreation, healthcare, transportation, entertainment, household management, and more. One major economic shift caused by the wide availability of computers is related to e-commerce.

E-commerce refers to the use of computers to purchase items through the Internet. For example, it has long been common for individuals to purchase clothing, electronics, and even perishable food items through an Internet site. These items are then delivered to the user or picked up by the user.

While the availability of e-commerce has greatly increased the availability of purchase options for users, it has also created difficulties for quickly identifying items of interest. For instance, a user may wish to purchase a particular item. Using a simple Internet search for the particular item, the user may be presented with thousands upon thousands of potential options. While the scope of options is important, it is often overwhelming and wastes time due to the time it takes to filter through the different options. To that end, these is a need for systems that intelligently suggest products that are needed and/or desired by a user.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable devices, hardware storage devices, mobile devices, etc.), and methods for intelligently predicting which items a user will add to an electronic shopping cart.

In some embodiments, there is a determination that an item has been added to an electronic shopping cart of a user. Natural language processing (NLP) is then used to determine a general product category of the item as well as one or more supporting product details of the item. The general product category and the one or more supporting product details of the item are used as parameters in a query executed against a database. Notably, the database links the item to one or more other items based on shared characteristics between the item and those other items. Additionally, a result of the query identifies those other items that are linked to the item. Based on an identified characteristic associated with the user, the embodiments filter the items included in the query result to generate a list of proposed items for potential inclusion in the electronic shopping cart. Furthermore, the list of proposed items is displayed to the user.

In addition to the above operations, some embodiments identify when a second item has been added to the electronic shopping cart. Then, the embodiments use the database to identify a recipe comprising the item and the second item. Based on the identified recipe, the list of proposed items is modified to include remaining items that are included in the identified recipe. That modified list of proposed items is then displayed to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 15 illustrates an example computer system that is structured and/or configured to perform any of the disclosed operations.

DETAILED DESCRIPTION

Figure 1:
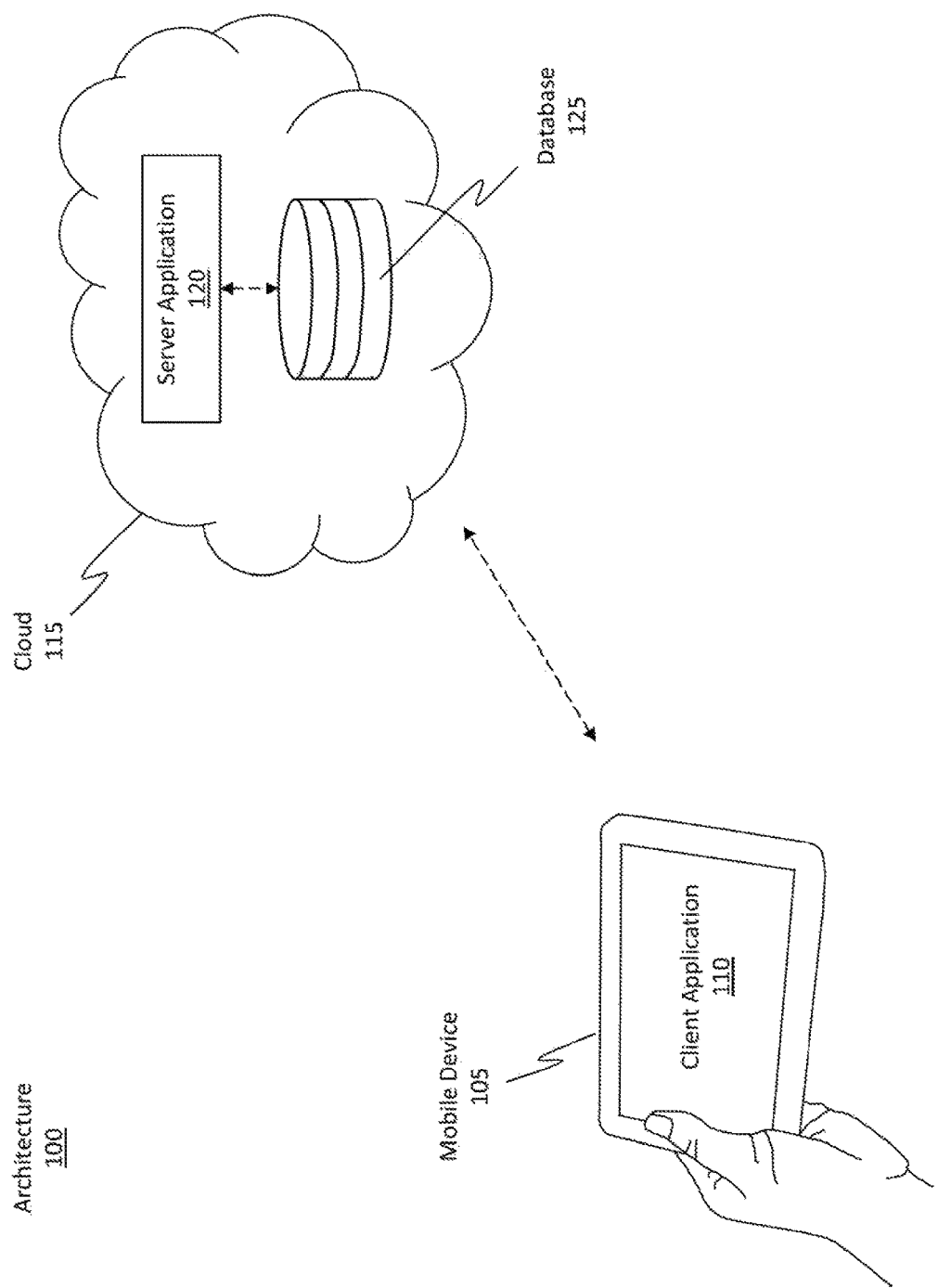
FIG. 1 illustrates an example architecture in which a client application, which is executing on a mobile device, is communicating with a server application, which is operating in a cloud environment, in order to intelligently predict which items a user will add to an electronic shopping cart.

Embodiments disclosed herein relate to systems, devices (e.g., wearable devices, hardware storage devices, mobile devices, etc.), and methods for intelligently predicting which items a user will add to an electronic shopping cart.

In some embodiments, an item is added to an electronic shopping cart of a user. Natural language processing (NLP) is used to determine a general product category (e.g., a "banana" or "water") and supporting product details of the item (e.g., an "organic" banana or "sparkling" water). The general product category and the supporting product details are used as parameters in a query executed against a database, which links the item to other items based on shared characteristics between the item and those other items. Additionally, a result of the query identifies those other items that are linked to the item. Based on an identified characteristic associated with the user, the embodiments filter the items included in the query result to generate a list of proposed items for potential inclusion in the electronic shopping cart. This list is displayed to the user.

In addition to the above operations, some embodiments identify when a second item has been added to the electronic shopping cart. The database is used to identify a recipe comprising the item and the second item. Based on the identified recipe, the list of proposed items is modified to include remaining items that are included in the identified recipe. That modified list of proposed items is then displayed to the user.

As used herein, the phrase "natural language processing" (NLP) should be interpreted broadly. For instance, one use of the phrase is where product inventory, demographic, commodity, and even transaction data is provided to a data ingress pipeline for detection, cleansing, normalizing, extracting, mapping, standardizing, storing, and model building. This ingress pipeline is able to utilize core engine libraries and models. The core engine leverages different types of AI/Machine Learning techniques including NLP, deep learning, and other classification methods, reinforcement learning, various clustering and optimization techniques, decisioning systems, and semantic knowledge representation. Also, non-AI processes (e.g., statistical methods, distributed big data pipelining and analytics, and web crawling) are in that core engine as well. A later section of this document will provide even further information regarding machine learning and NLP.

Another use of the NLP phrase is for the search process. That search operation may also use the core AI engine and may also perform upfront NLP specific work. Yet another use of the NLP phrase refers to the description of actual NLP type work such as extracting components and relationships in various textual aspects. Further details will be provided later. Accordingly, NLP can refer to any of the machine learning processes mentioned herein.

Additionally, one will appreciate how the term "recipe" should also be interpreted in a broad manner. For instance, explicitly encoded knowledge such as a food recipe or parts of a bill of materials are included in the term recipe. Additionally, tacitly derived or inferred knowledge, such as how products are used together or how stores place products together, should also be included in the interpretation of a recipe. As such, both explicit and inherent or inferential recipes are included herein.

As will be described in more detail later, in some cases, there may be different distinct flows, including: an ingestion flow, a search flow, and a selection flow. For example, in the ingestion flow, a merchandiser will provide inventory data and transaction history inventory data. This data is then categorized via the core AI engine. The transaction data may be clustered in a variety of ways for personalization. In some cases, the merchandiser may maintain a database of records that list items purchased for any number of customers. The information included in the database can be the inventory and transaction history mentioned above.

In the search flow, a user searches for products. Here, NLP is used to interpret and search. For instance, the categorized inventory is searched against the system's interpretation of the user's input. In some cases, the merchandiser's own database may be used or queried to perform the disclosed search operations. The embodiments are able to monitor how consumers interact with the store's products. Accordingly, the embodiments are able to receive a product inventory from a merchandiser and map those items to a knowledge representation of products (e.g., food and other products). When a consumer interacts with the system, the embodiments utilize these repositories of information in order to enhance the consumer's experience. In the situation where a consumer performs a search, then the embodiments utilize NLP to determine what the consumer is searching for, as will be described in more detail later. Accordingly, each time a new product is added to a merchandiser's inventor, it may be the case that the embodiments remap the products and the inventory to make connections between those items, as will be described in more detail later.

In the selection flow, personalization from past transactions and current cart selection is applied in the selection flow. For instance, the user can select items for cart personalization from past transactions and from the current cart. In some implementations, instead of reevaluating or recomputing recommendations each time an item is placed in an electronic shopping cart, the embodiments are able to leverage past purchase information and use that past purchase information to submit new recommendations (as opposed to performing NLP processing on current items in the shopping cart). As such, the embodiments are able to leverage or capitalize on the inventory and transaction history to make current recommendations. Addition details on these features will be provided later.

While the present disclosure focuses on electronic shopping carts and online shopping, in at least one embodiment, the present invention may be utilized within a physical brick-and-mortar store. For example, the user's items may be scanned during the check-out process by a cashier or by the user in a self-check-out. During the scanning process, the point-of-sale computer system may display other items to the user that are recommended purchases based upon the scanned items.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about real and substantial benefits to the technical field. For instance, the embodiments are able to improve the efficiency by which a user operates a computer system through the use of machine learning and natural language processing. In particular, the embodiments are able to predict which items the user is searching for and then present or display those predicted items on a user interface. By making this prediction, not only will the user's experience with the computer system will be improved but the performance of the computer system will also improve through progressive learning and refinement. That is, the computer system will be able to learn over time and provide enhanced results as a result of its learning. As a result, queries executed against databases will be improved and the operations of the system and architecture will be improved as well.

The disclosed embodiments also beneficially provide numerous different types of personalized online grocery consumer services. For instance, the disclosed embodiments advantageously provide any number of item recommendations (e.g., given a single selected item, what other items would the user likely be interested in). The embodiments also provide electronic shopping cart recommendations (e.g., given an online shopping cart being filled, what other items might be of interest to the user at each cart state). Even further, the embodiments provide a consumer or user home page or starting page recommendation (e.g., given no items in a shopping cart and nothing yet selected, what items would the user be mostly likely interested in).

Example Architecture And User Interface

Attention will now be directed to FIG. 1, which illustrates an example architecture 100 that may be used to facilitate operations for intelligently predicting which items a user will add to an electronic shopping cart. In particular, FIG. 1 shows a mobile device 105 executing a client application 110. Mobile device 105 may be any type of mobile device, including, but certainly not limited to, any type of mobile phone, tablet, PDA, laptop, and so forth, without limit. Mobile device 105 includes network communication abilities to enable the client application 110 to communicate with the Internet and with a cloud 115 environment operating in the Internet. Mobile device 105 may use a Wi-Fi network connection, a telecommunications network connection (e.g., 3G, 4G, 5G, and so on), or even a wired ethernet or other wired connection to connect with the Internet.

Cloud 115 is shown as executing a server application 120, which is able to communicate with a database 125. In this regard, the client application 110 is able to communicate with the server application 120 in order to utilize information included in the database 125. In some cases, the client application 110 is able to communicate directly with the database 125 without interfacing with the server application 120. In some cases, the database 125 is local to the mobile device 105 while in other cases the database 125 is remote to the mobile device 105, as shown in FIG. 1. Accordingly, this architecture 100 may be used to facilitate the operations describe herein.

In some embodiments, the disclosed services and applications are provided through a grocer or food delivery service's web or phone application. In some embodiments, the applications are non-food related service applications. The web or phone application is able to communicate across the Internet to one of the Internet or cloud services in order to present responses to the user by the grocer's (or other service's) application.

Figure 2:
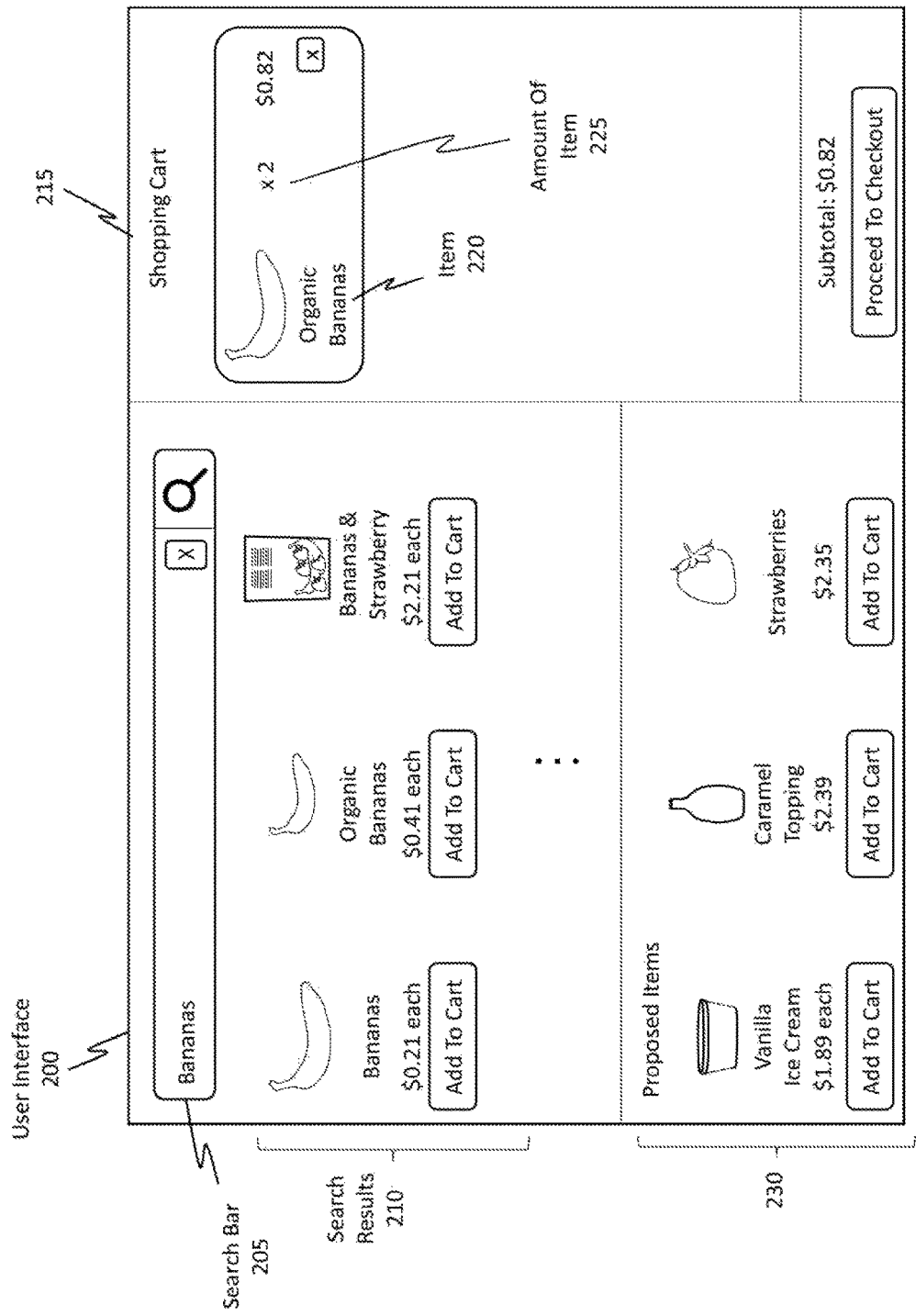
FIG. 2 illustrates an example user interface that may be used to display items and an electronic shopping cart.

FIG. 2 shows an example user interface 200 that may be executing as a part of the client application 110 from FIG. 1. User interface 200 is shown as including a search bar 205. Currently, the term "Bananas" has been entered into the search bar 205. Based on the search term, the client application is able to execute a search in order to find items related to the search term.

For instance, the search results 210 show results that are all related to the term "Bananas." To further illustrate, notice how the search results 210 is displaying a "Bananas" result, an "Organic Bananas" result, and a "Bananas & Strawberry" result. All of the results are related to the search term in some manner. The search may be executed against an inventory provided by a grocer, retailer, wholesaler, or other supplier of goods or services.

The user interface 200 is also shown as including a shopping cart 215. When items are added to the shopping cart 215, the client application recognizes these items as being items the user of the user interface 200 desires to purchase. For instance, in this example case, the user has added the "Organic Bananas" search result into the shopping cart 215, as shown by item 220 (e.g., by pressing the "Add to Cart" button in the user interface 200, the corresponding item is added to the shopping cart 215).

In some cases, the shopping cart 215 also lists the quantity or the amount of item 225 that has been added to the shopping cart 215. In this case, the user has added a quantity of "2" Organic Bananas to the shopping cart 215. The price for an individual Organic Banana is $0.41. Because the user has added two of them to the shopping cart 215, the shopping cart 215 reflects that the total price for that item is currently $0.82. In the event more Organic Bananas are added, then the price will increase. Similarly, in the event other items are added to the shopping cart 215, then the subtotal will likewise increase.

Accordingly, user interface 200 may be used to enable a user to search for a particular item he/she desires to purchase. The underlying client application can receive the entered search terms and then conduct a search to find items corresponding to those search terms. Once found, those items may be visually displayed for the user to view and potentially select for inclusion in an electronic shopping cart. Although the example shown in FIG. 2 (as well as many of the other figures) is focused on the selection of food-based items (e.g., Bananas), one will appreciate how the embodiments are not limited to food-based items. Indeed, any type of item may be searched for, displayed, and added to an electronic shopping cart. That is, food-based items and non-food based items may be used. Any type of textile, equipment, good, product, or even service may be used as well, without limit.

In accordance with the disclosed principles, the embodiments are able to analyze the contents of the electronic shopping cart 215 and identify additional items that are linked to the items currently included in the shopping cart. The term "linked," in this context, should be interpreted broadly as meaning one item shares a particular relationship with another item as a result of those two items having a common characteristic. This common characteristic is often identified by performing a deep dive or deep search into specific characteristics and features of those items as opposed to simply identifying that one item is often purchased at a same time as another item, as reflected by those item's URI (uniform resource identifier), which is a superficial linkage. Further details on these aspects will be provided later. Notably, the term URI should be interpreted broadly and includes, but is not limited to, any type of UPC (universal product code), SKU (stock keeping unit), PLU (price look-up code), EAN (European article number), ASIN (Amazon standard identification number), ITINs, URL (uniform resource locator), and so on.

In any event, however, the embodiments are able to display a list 230 of proposed items that are identified as having a granular, deep, or meaningful relationship with the item or items included in the shopping cart 215, where that relationship is not simply a superficial correlation in which those items are often purchased with one another. Notably, this list 230 of proposed items is provided in real-time, such that it is substantially provided instantly without a noticeable delay after an item has been added to the shopping cart 215. In some cases, as will be discussed in more detail later, the list 230 of proposed items can be generated even in circumstances where the user has not added anything to the shopping cart 215 and even when the user has not entered any search terms in the search bar 205. Notice, the list 230 of proposed items is displayed simultaneously with the electronic shopping cart 215 and is also displayed simultaneously with other features of the user interface 200.

By way of a brief introduction into the difference between a deep connection/relationship and a superficial relationship, the embodiments are able to utilize natural language processing (NLP) to parse text describing an item. For instance, with reference to FIG. 2, the user has added "Organic Bananas" to the shopping cart 215. The embodiments are able to use NLP to parse the product text and details for the Organic Bananas product to identify specific features and characteristics regarding that product. By way of example, not only is this product related to "Bananas" but it is also a specific kind of banana, namely an "Organic" banana.

The embodiments are able to identify these specific characteristics and then use those characteristics to identify other items that are linked to that item. By way of example, because the user specifically selected "Organic" bananas as opposed to non-organic, the embodiments are able to discern or predict that the user prefers organic products over non-organic products. To have a product certified as being "Organic," the production of that product is required to meet certain requirements. In this scenario, therefore, the embodiments can predict that the user desires to purchase other organic products that would be prepared well with the selected product (e.g., perhaps within the same recipe). As such, the disclosed embodiments identify other items that share a relationship with the selected item (e.g., perhaps they are included in the same recipe) and then display those items for the user's consideration.

Notice, the embodiments do not rely simply on purchase-based relationships, such as the fact that one item may be routinely purchased with another item based on URI correlations. Instead, the embodiments perform a deep dive or deep review of the item's details to identify specific features and attributes of that item. Once those features are identified, then the embodiments search for other items that are linked to the original item and provide a list detailing those proposed items.

Relying simply on URI correlations is often disadvantageous. For instance, consider a scenario in which a brand-new item is made available, where this brand-new item has never been offered for sell before. In this case, that item will not have a URI purchase history associated with it, so if only URI histories were used, then the proposed list of associated items would be empty. On the other hand, because the disclosed embodiments perform a deep dive into the product's characteristics, the embodiments are able to make intelligent proposals for other items even though the original item is entirely brand new. Further details will be provided regarding these features. Accordingly, the list 230 of proposed items (e.g., the "Vanilla Ice Cream," the "Caramel Topping," and the "Strawberries") are items that are identified as sharing a linkage or common characteristics with the item 220 added to the shopping cart 215 in FIG. 2.

Identifying An Item's Details

Figure 3:
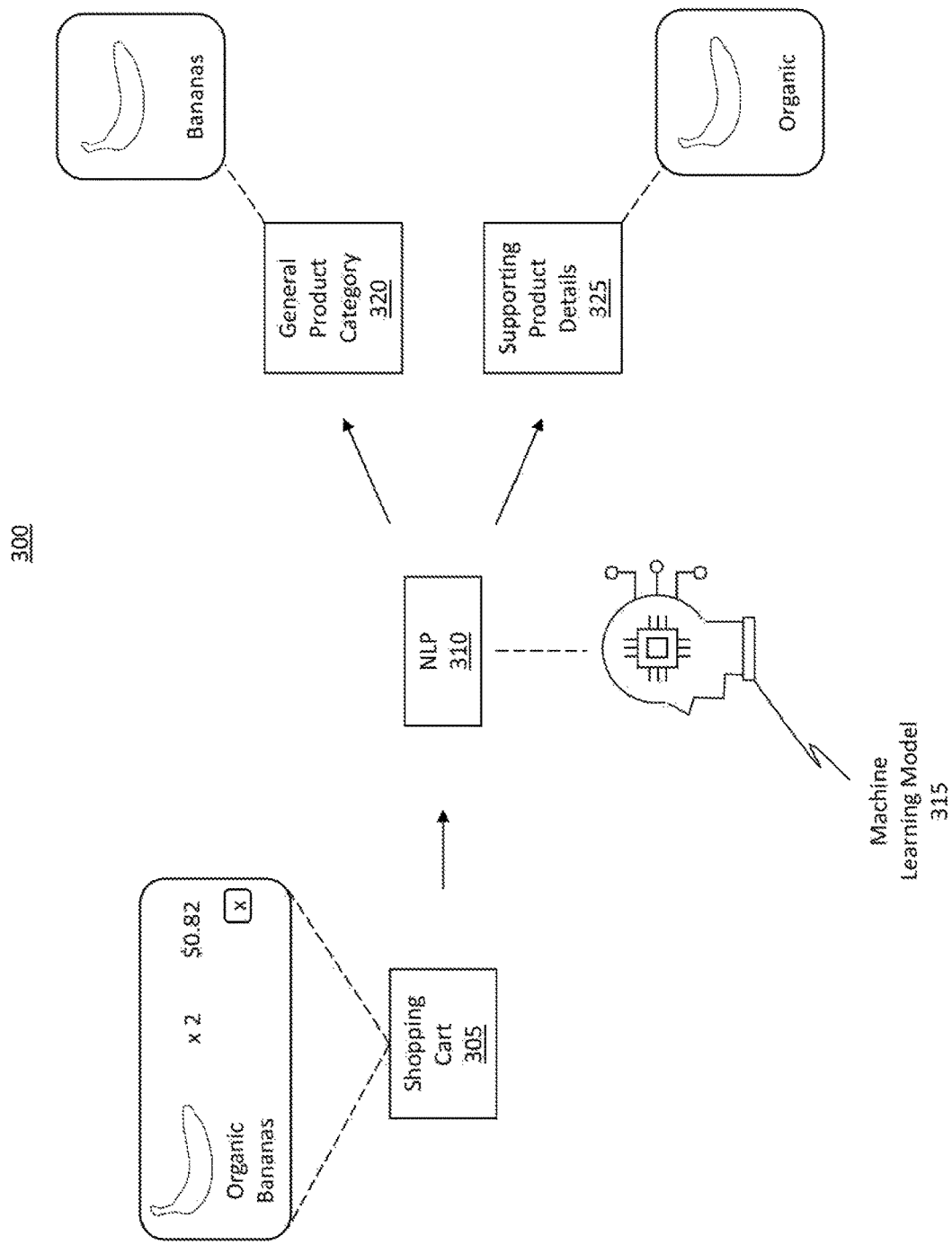
FIG. 3 illustrates how natural language processing (NLP) may be used to parse the language associated with one or more items added to a shopping cart in order to identify what those items actually are based on the parsed text.

Attention will now be directed to FIG. 3, which illustrates a flow chart 300 of an example process for identifying an item's details (i.e. for performing a deep dive to learn the specific features and characteristics of an item that has been added to an electronic shopping cart). Initially, a shopping cart 305 is accessed. In this case, shopping cart 305 is representative of the shopping cart 215 from FIG. 2.

In this example, shopping cart 305 is shown as currently including an item (e.g., "Organic Bananas"), such as the item 220 from FIG. 2. When an item is added to the shopping cart 305, that item is fed as input into an NLP 310 engine (NLP stands for natural language processing). In some embodiments, the NLP 310 is a machine learning model 315.

As used herein, reference to "machine learning" (ML) or to a ML model may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations. Accordingly, NLP in combination with any other type of machine learning process may be utilized, as was described earlier.

Figure 4:
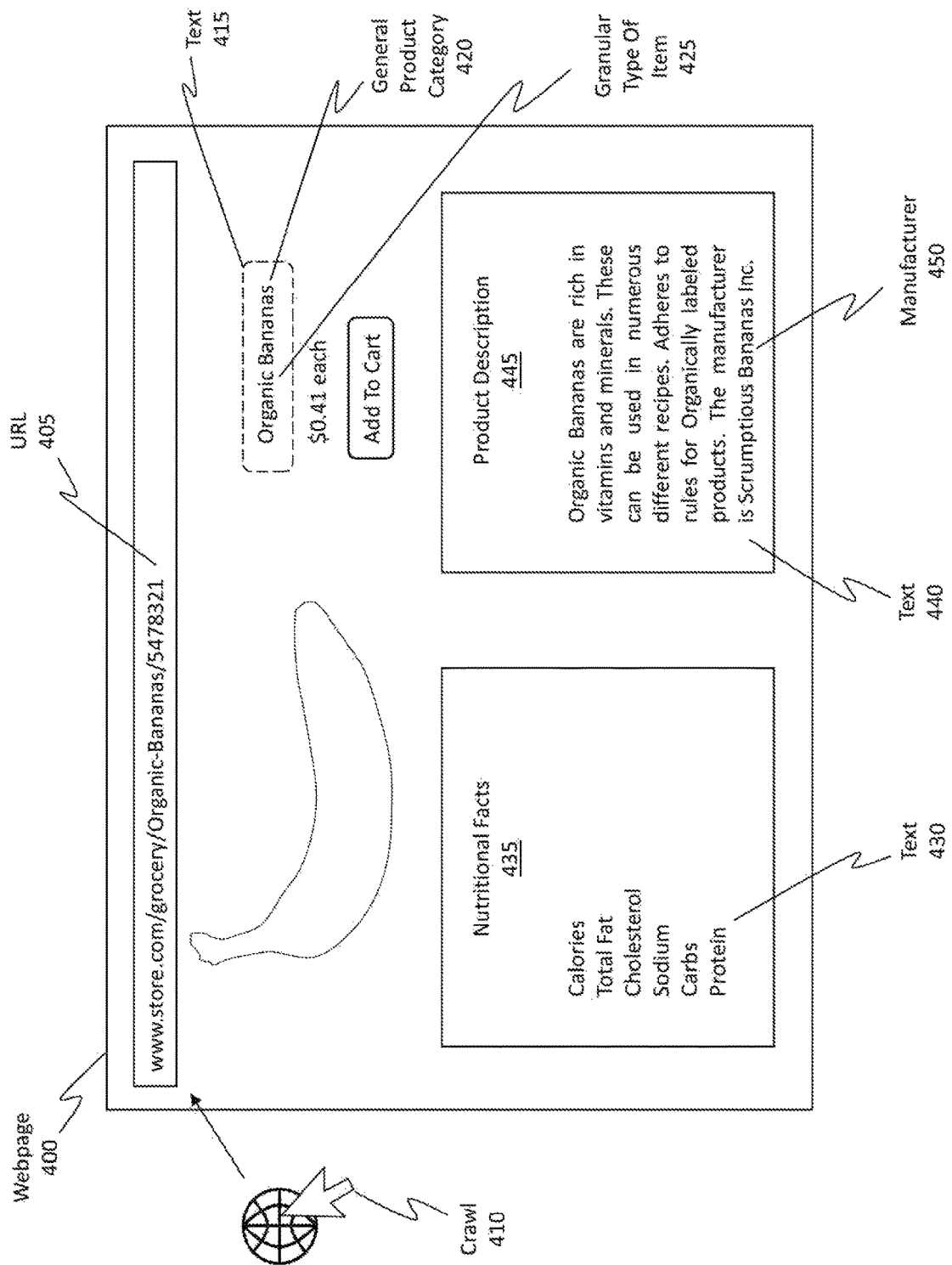
FIG. 4 illustrates a webpage associated with a particular item. The NLP is also able to crawl to this webpage and parse the text included in this webpage to learn or identify additional information describing the item.

The NLP 310 engine is able to identify specific features of the item in a number of different ways. For instance, in some cases, the NLP 310 engine is able to analyze and parse only the text that is currently on display in the shopping cart 305. In some cases, the NLP 310 engine is able to identify a URI associated with the item currently included in the shopping cart 305. Once the URI is identified, the NLP 310 engine can navigate or crawl to a webpage identified by the URI. FIG. 4 is illustrative of this concept.

FIG. 4 illustrates a webpage 400 for the URL 405, which is associated with the Organic Bananas item that was added to the shopping cart 305 in FIG. 3. In some cases, the NLP 310 engine is able to crawl 410 to the webpage 400 in order to examine and analyze the item's product features.

For instance, the NLP engine can parse the different bodies of text, pictures, charts, diagrams, or any other content included in the webpage 400 to learn more about the specific item. By way of example, the NLP engine can parse the text 415 to identify a general product category 420 for the item (e.g., the item is a "Banana") and a granular type of item 425 (e.g., the banana is specifically "Organic"). The NLP engine can parse other text as well, including the text 430 to identify nutritional facts 435 (e.g., calories, total fat, etc.). The NLP engine can parse the text 440 to identify a product description 445 for the item. Notice, in the product description 445, there is an identification of the manufacturer 450 of the item. The NLP engine is able to identify this information.

Figure 5:
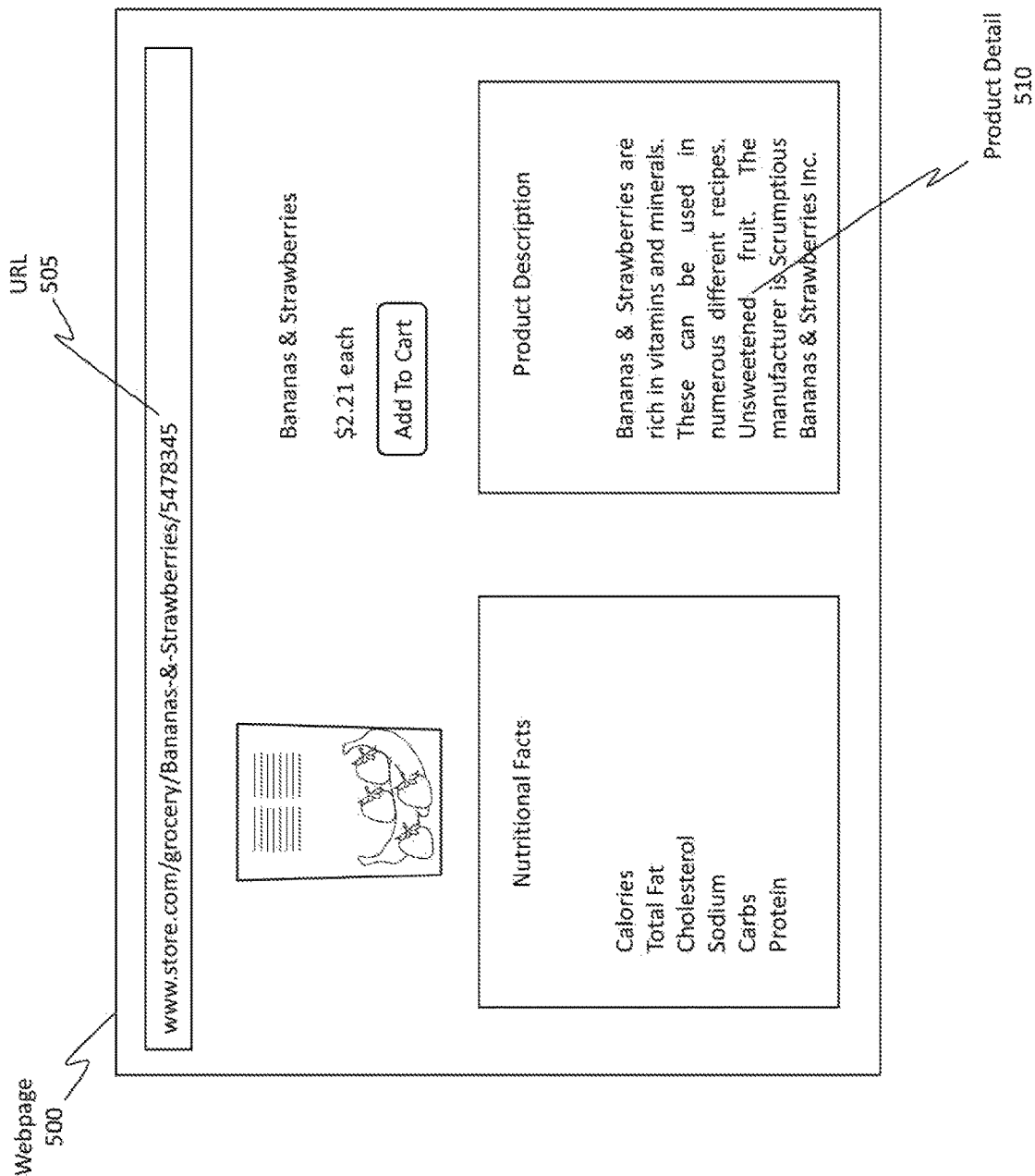
FIG. 5 illustrates another example of an item's webpage.

FIG. 5 illustrates another webpage 500 for a different URL 505 of a different product (e.g., Bananas & Strawberries). In the event this product was added to the shopping cart, the embodiments would be able to analyze the text and other content of this webpage 500 to identify features and characteristics about this product as well. For example, the embodiments are able to identify the specific product detail 510 for this product, which detail identifies this product as being "Unsweetened." In some cases, the supporting product details includes an amount of the item that has been added to the electronic shopping cart. In some cases, the supporting product details includes a manufacturer of the item or even includes a granular type of the item within the general product category (e.g., the item is not just a "banana" but it is an "organic banana"). Any amount of product details may be identified by the NLP engine when the engine analyzes a product's description.

Returning to FIG. 3, the NLP 310 engine is able to at least identify a general product category 320 of the item (e.g., in this case the item is a food-based "Bananas" item) and supporting product details 325 (e.g., in this case the item is an "Organic" item). The supporting product details describe a particular type of the item at a granular level (e.g., "Organic" bananas, "Sparkling" water, etc.). The NLP 310 engine is able to parse and identify this information in various different ways.

For instance, the NLP 310 engine is able to utilize any type of optical character recognition (OCR) to identify and determine text that is recognizable. The NLP 310 engine is also able to perform word segmentation (often called tokenization) in order to separate bodies of text into different words. The NLP 310 engine is also able to perform a morphological analysis on the text, such as by performing morphological segmentation or even part-of-speech tagging. The NLP 310 engine is also able to perform syntactic analysis to identify the underlying syntax of words describing the item. By way of example, the NLP 310 engine can perform both dependency parsing (i.e. identifying relationships between words in a sentence) and constituency parsing (i.e. generating a parse tree based on the relationship between the words). The NLP 310 engine can also perform any type of lexical semantics, distributional semantics, named entity recognition, sentiment analysis, terminology extraction, and even word sense disambiguation. Accordingly, the NLP 310 engine is able to perform any type of natural language processing to identify the general product category 320 (e.g., what the item "is" in a general sense) and the supporting product details 325 of the item (e.g., specific or granular characteristics of the item).

In some embodiments, the process of using the NLP 310 to determine the general product category 320 of the item and the supporting product details 325 of the item includes identifying a uniform resource locator (URL) associated with the item. The embodiments then crawl to a webpage identified by the URL, as was discussed with respect to FIGS. 4 and 5. The NLP 310 is then executed against text included in the webpage such that the NLP 310 parses the text to identify the general product category 320 and the supporting product details 325. In some embodiments, the NLP 310 is simply executed against any text or imagery included within the shopping cart without having to navigate or crawl to a different webpage from the webpage of the shopping cart.

Identifying Items That Share Common Characteristics

Figure 6:
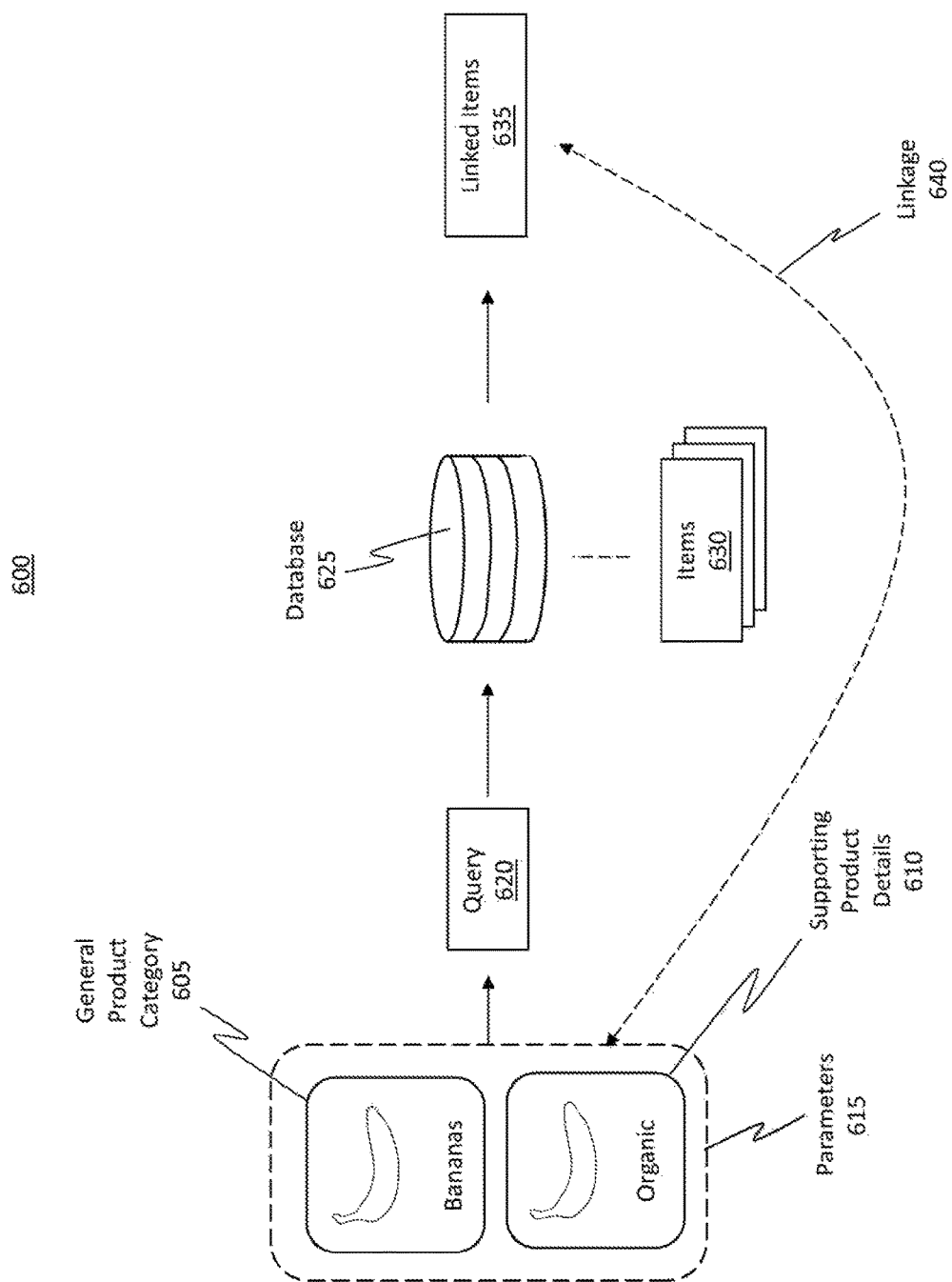
FIG. 6 illustrates how, once the item is identified using the NLP, that item's descriptive information can be used as query parameters for execution against a database in order to find other items that share common characteristics with the item.

FIG. 6 shows a flow chart 600, which is a continuation of the flow chart 300 from FIG. 3. For instance, FIG. 6 shows how the embodiments have identified an item's general product category 605 and supporting product details 610 in accordance with the operations outlined in the flow chart 300 of FIG. 3. The general product category 605 and the supporting product details 610 are then organized or formatted as parameters 615 for a search query 620 that is to be executed against a database 625. Here, the database 625 may be representative of the database 125 from FIG. 1. The database 625 may be local or remote to the user's device.

Database 625 is designed to record and manage information describing any number of items 630, such as item 220 from FIG. 2. For instance, the database 625 can include a line item listing an item, as well as the item's general product category and the item's supporting product details (e.g., make, model, manufacturer, version, type, granular details, etc.). Indeed, the database 625 may maintain any amount of information describing an item.

In addition to an item's details, the database 625 also maintains linkages, relationships, or correlations between items. Such linkages may be formed from any type of relationship existing between one item and another item. By way of example and not limitation, two items may be included within a same recipe; as such, the database 625 may identify the recipe and may provide a linkage between those two items because they are included in the same recipe. Other examples of linkages include, but are not limited to, same manufacturers, products included within a same instruction set (e.g., perhaps the items are construction items used to build a piece of furniture), items included within a particular promotion or advertisement, and so forth. Additional linkages will be described later. The data used to populate the database 625 may be obtained from any source, without limit. Example sources include, but are not limited to, Internet searches, retailer's or wholesaler's stored database records, publicly available data, any accessible recipe data, any accessible instruction set data, and so on.

Figure 7:
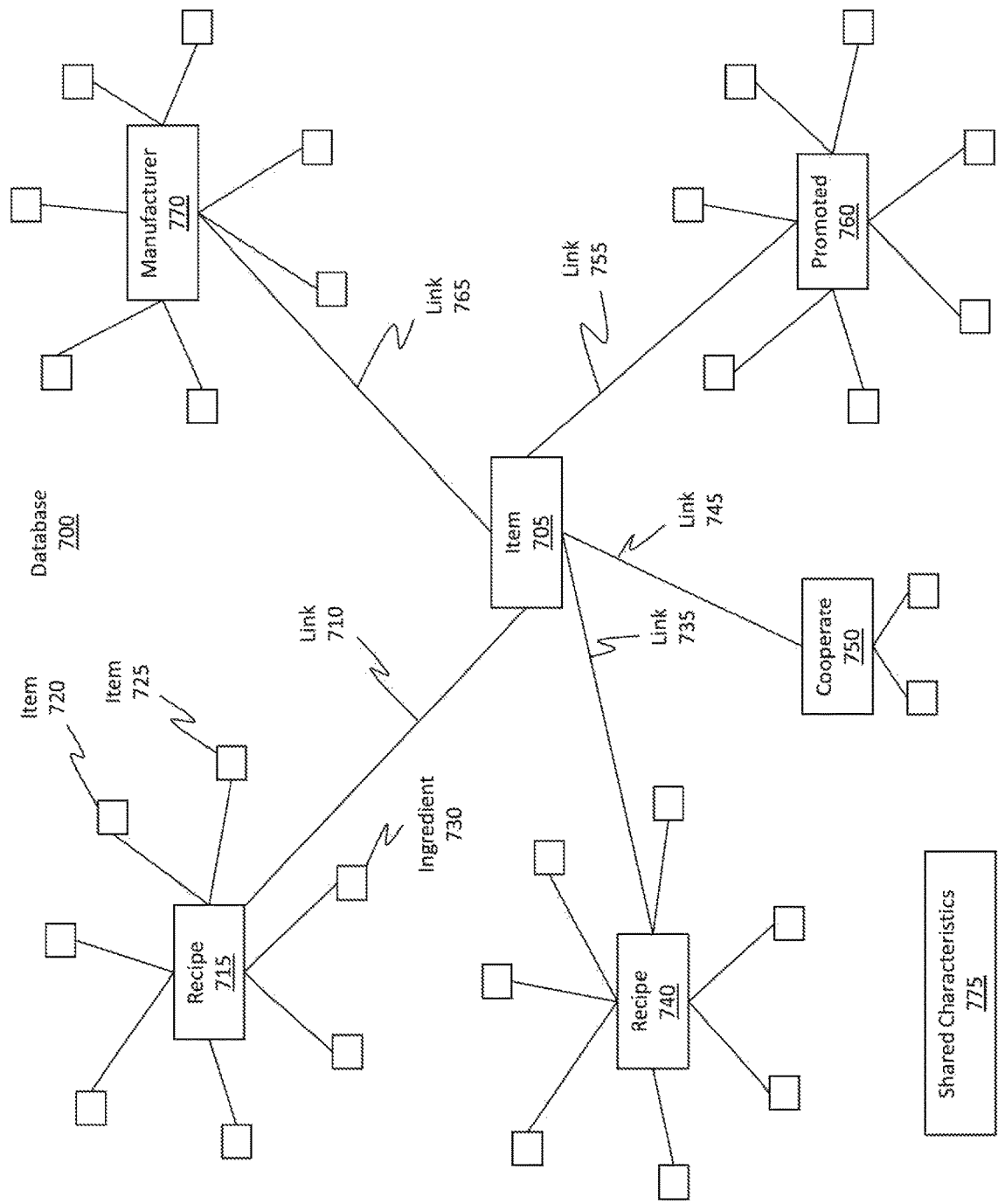
FIG. 7 illustrates a map showing how an item may be linked to any number of other items based on characteristics shared by those items. For example, the item may be linked to another group of items because those items are all used within a particular recipe.

Turning briefly to FIG. 7, this figure illustrates some example linkages that are included within a database 700, which is representative of the database 625 from FIG. 6. Here, FIG. 7 shows an item 705, which is representative of the item 220 from FIG. 2. Item 705 is shown as being linked to a number of other items and/or groups of items. For instance, link 710 shows how the item 705 is included within a particular recipe 715. Recipe 715 is shown as including not only item 705, but also item 720, item 725, and item/ ingredient 730. The small squares are representative of items included within the recipe 715. These items may be ingredients or perhaps cooking instruments needed to perform the recipe 715. In any event, the items 705, 720, and 725 as well as ingredient 730 all share a common characteristic as a result of being included within the same recipe 715.

Item 705 is also linked, as shown by link 735, to a different recipe 740, which includes a number of other items, as represented by the small squares. Similarly, item 705 is linked, as shown by link 745, with a number of other items that cooperate 750 with item 705. For instance (in a different example from the Organic Bananas example), suppose item 705 was a beater component of an electronic blender. Here, item 705 is a cooperative element that works in conjunction with the blender. As another example, suppose the item 705 were a chain of nails that works in conjunction with or cooperatively with a nail gun. As yet another example, suppose the item 705 were a paint roller that works in conjunction with or cooperatively with a can of paint.

Figure 8:
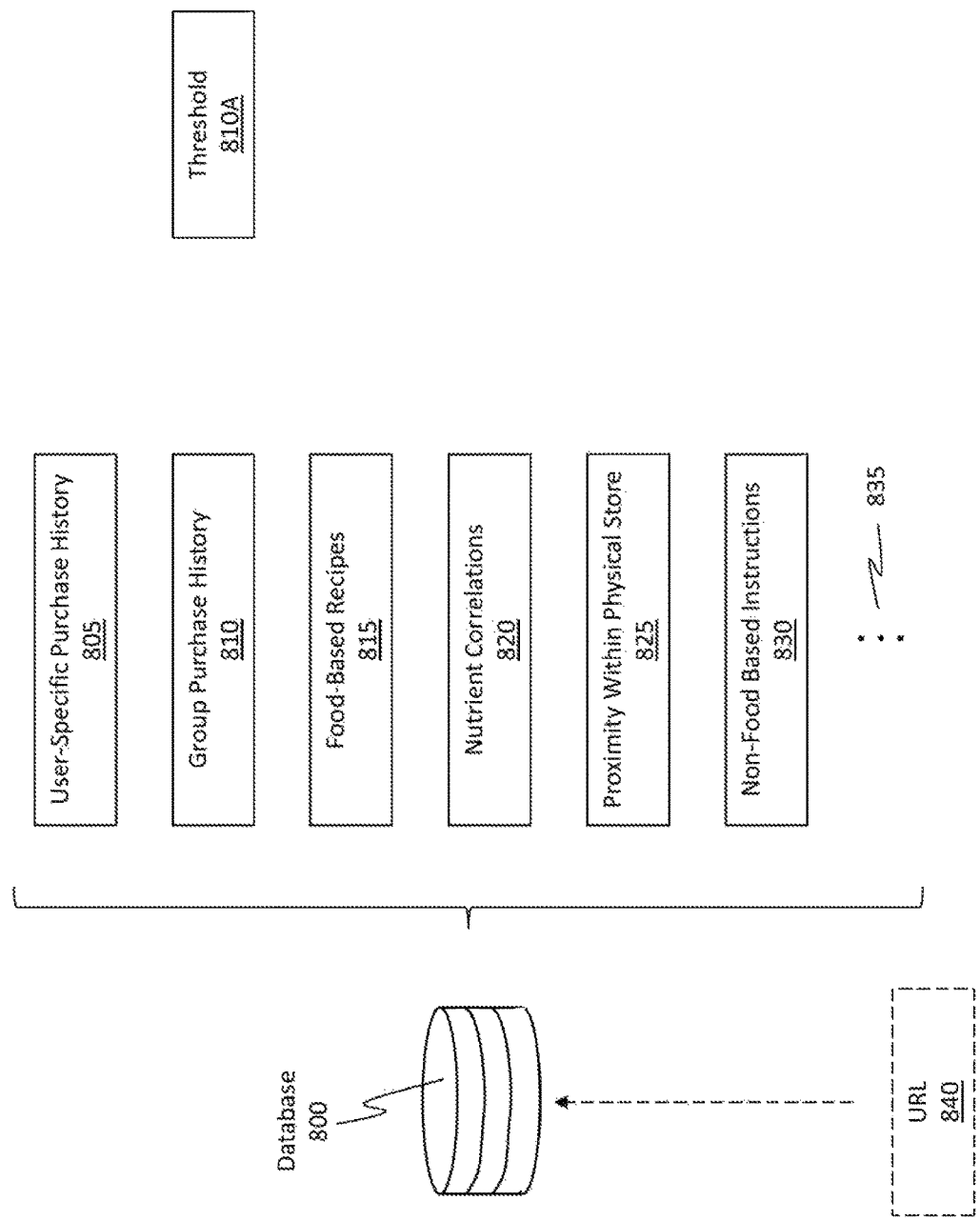
FIG. 8 illustrates some example characteristics that may be considered when determining whether an item is linked with or shares a relationship with another item.

Continuing with FIG. 7, item 705 is also linked, as shown by link 755, to a set of items that are currently being promoted 760 (e.g., perhaps they are all part of a same promotion or advertisement scheme used to sell or promote those items). Finally, item 705 is shown as being linked, as shown by link 765, with a number of other items that have the same manufacturer 770. Accordingly, the database 700 is able to link one item with any number of other items based on shared characteristics 775 that exist between those items, whether those shared characteristics 775 be in the form of a common recipe, common manufacturer, cooperative association, promoted association, and so forth, without limit. For instance, in some embodiments, the one or more shared characteristics 775 between one item and one or more other items is an identification that the item and the one or more other items are both ingredients in a same recipe. FIG. 8 provides some additional clarification detailing how items may be linked, associated, or related.

FIG. 8 shows a database 800, which is representative of the databases discussed thus far. As discussed earlier, the database 800 is able to maintain linkages, correlations, associations, mappings, or relationships between any number of different items, where those linkages are generated based on characteristics shared between the different items. FIG. 8 lists some different techniques or methods by which characteristics may be "shared" between items. It should be noted how the data used to create the histories, inventories, food knowledge, linkages, and machine-learning models may come from a variety of private sources (e.g., grocers, retailers, wholesalers, etc.), public sources (e.g. government databases), and internal sources (e.g. service utilization data). These are loaded into or accessed by the system via various mechanisms and then extracted, cleansed, normalized, and analyzed before being persisted into the forms used for the recommendations or proposals.

By way of example, items may be linked together because those items are included in a user's user-specific purchase history 805. As used herein, the user-specific purchase history 805 is a log or accounting of products or items a particular user has purchased in the past. Each user may have his/her own corresponding user-specific purchase history. The duration or amount of time this user-specific purchase history 805 tracks may extend indefinitely or may be limited to a predetermined duration (e.g., the past one month, two months, three months, six months, 9 months, 12 months, 24 months, 3 years, and so forth). In any event, the user-specific purchase history 805 is able to monitor, record, log, and even provide auditing functionality for the items the user has purchased in the past.

Accordingly, the database includes a user-specific purchase history 805 for the user. One or more shared characteristics between the item and one or more other items includes an identification that the item was previously purchased at a same time as the one or more other items, as reflected or as monitored by the user-specific purchase history 805. Being purchased at the "same time" may mean that the items were purchased within the same transaction as one another or perhaps within the same day as one another. In some cases, being purchased at the "same time" may mean that one item was purchased from one supplier and then, within a threshold time period (e.g., a selected number of seconds, minutes, hours, or perhaps even days), another item was purchased by a second supplier. Because both items were purchased during the threshold time period of one another, then those items are considered as being purchased with one another.

The database 800 also maintains a group purchase history 810 detailing the items previously purchased by one or more different groups of users, where formation of the groups may be based on shared characteristics between the users in each group. For instance, suppose a family has 6 individuals. A group may be formed for those individuals as a result of them all being within the same family unit. Likewise, a group may be formed for users who work at a same business. Indeed, the formation of a group may be made based on any criteria, without limit.

The group purchase history 810 is able to track, record, and log the purchases made by individuals or users included within a particular group. In some cases, in order to be logged within the group purchase history 810, the item may be subject to a particular threshold 810A requirement, where this threshold 810A requires the item to be purchases a threshold number of times or by a threshold number of users prior to being logged within the group purchase history 810. By imposing this threshold 810A, the system can refrain or prevent from becoming overburdened by tracking one-off or one-time purchases.

Accordingly, in some embodiments, the database 800 includes a group purchase history 810 detailing purchases previously made by a group of users. One or more shared characteristics between a particular item and one or more other items includes or is an identification that the item and the one or more other items were previously purchased together by a threshold number of users included in the group of users, as detailed by the group purchase history 810. The same discussion regarding the "purchased together" feature applies equally to the group purchase history 810. Similarly, the group purchase history 810 may extend in the past any duration of time.

The database 800 is also able to maintain associations between items using food-based recipes 815. A recipe is an instruction set detailing how to prepare a set of ingredients in order to make a particular food dish. In this manner, a recipe links ingredients or items together. Any number of recipes and any type of recipe may be monitored by the database 800.

In some cases, items are linked together based on nutrient correlations 820. For instance, a person who has celiac disease may not be able to ingest foods with gluten. The nutrient correlations 820 may be a linked set of items that omit gluten in their ingredients. Other examples of nutrient correlations 820 include, but certainly are not limited to, a set of items that omit a particular ingredient (e.g., omit gluten, omit preservatives, omit salt, omit sugar, omit artificial sweeteners, and so forth) or that include a particular ingredient (e.g., include whey protein, include casein protein, include caffeine, and so forth). The inclusion of any nutrient or even the omission of any nutrient may cause items to be associated with one another and may be tracked via the nutrient correlations 820. In some cases, the nutrient correlations 820 provides food domain knowledge regarding attributes and characteristics of the food.

Figure 9:
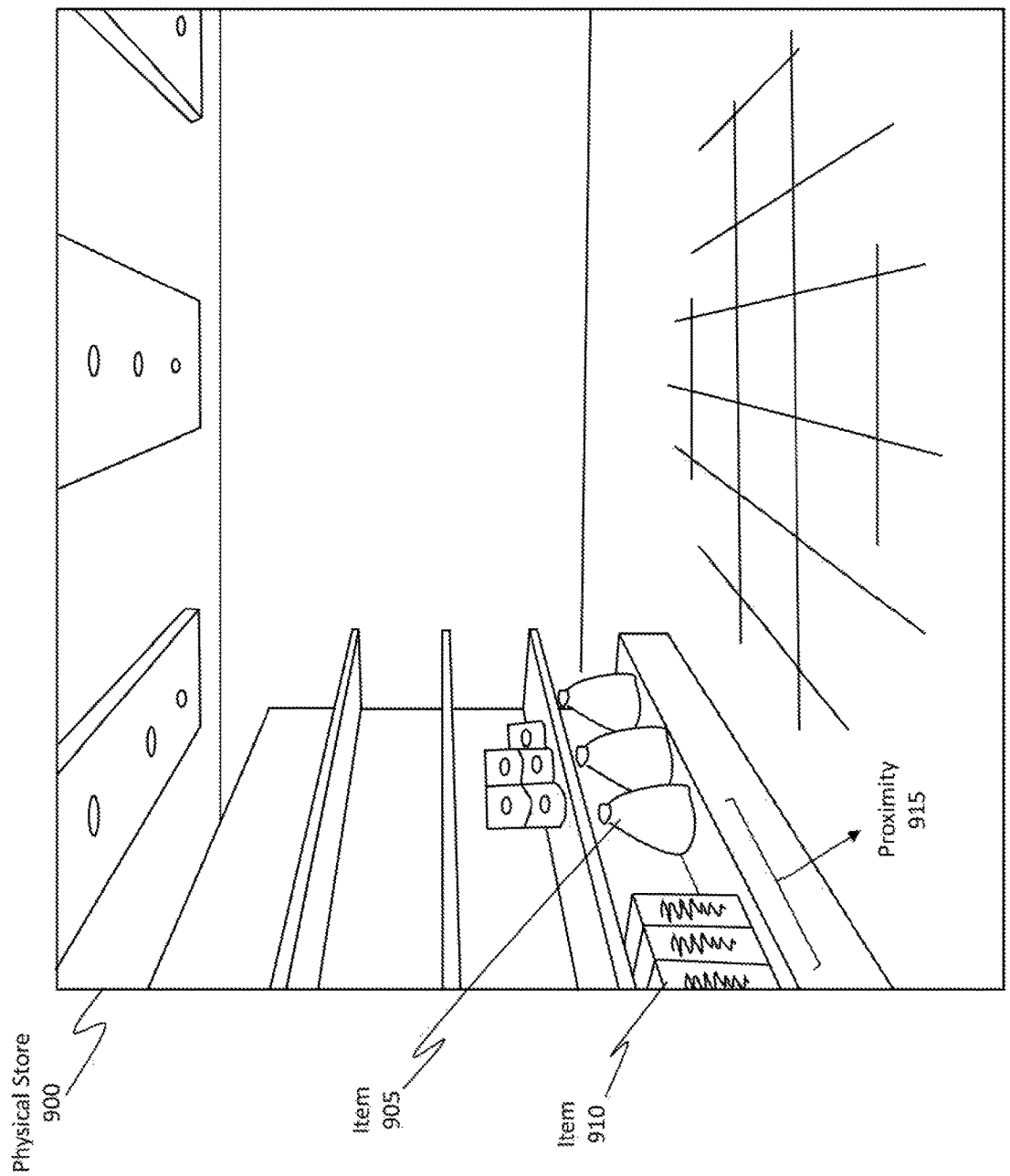
FIG. 9 illustrates how an item can be linked to another item based on their proximity to one another in a particular brick-and-mortar store.

Some embodiments link items based on their proximity to one another in a brick-and-mortar store, as represented by the proximity within physical store 825. For instance, turning briefly to FIG. 9, this figure shows a physical store 900 that has a number of aisles. In one aisle, the store has shelved an item 905 and another item 910. Notice, these two items are within a particular proximity 915 to one another. If that proximity 915 satisfies a threshold proximity requirement (e.g., a selected number of shelves separating the items, a selected number of feet between the items, a selected number of aisles separating the items, and so forth), then those items may be linked together within the database 800 of FIG. 8.

Often, items are placed on shelves in a strategic and meaningful manner. For instance, highly popular brands or items are often shelved at eye level for easy pick up. Less popular items may be located at the upper or lower portions of a shelf. Sometimes, in an effort to promote or advance a particular item, the item may be moved to a more prominent or popular location (e.g., eye level) in order to try to sell more of that item. As such, stores typically track specific locations of items on their shelves. The disclosed embodiments are able to generate correlations or links between items based on their physical proximity to one another within an actual store.

Returning to FIG. 8, the database 800 is also able to track linkages between non-food based items and their use in instructions, as shown by the non-food based instructions 830. For instance, suppose a set of instructions outlines the use of a nail and a hammer to build a bookcase. As a result of being included within the bookcase instructions, there is a linkage between the nail and the hammer. Of course, this is only one type of non-food example, and the principles should be applied to any type of non-food implementation. Indeed, the ellipsis 835 symbolically represents how the embodiments are able to identify, track, log, and audit any number and any type of linkages between items.

Accordingly, the embodiments identify linkages based on an NLP analysis and not necessarily based on URIs. Although the embodiments do not rely solely on URIs to identify relationships or linkages between products, this does not mean that the embodiments are not able to do so. In fact, some embodiments do augment or supplement the information included within the database 800 with URL 840 data. That is, the embodiments are able to generate linkages by identifying which items are often purchased with other items by tracking correlations or links between URIs. The URL 840 is shown in a dotted format to show how the embodiments are not strictly dependent on URI data. Instead, the embodiments rely primarily on using an NLP analysis to identify items and then to identify objects that are linked to the item based on shared relationships. On the other hand, in some embodiments, though not necessarily all, the database 800 refrains from linking an item to one or more other items based on relationships between uniform resource locators (URLs) of the item and the one or more other items.

Accordingly, the database 800 is able to link or map one item to any number of other items based on shared characteristics. In some cases, the database maps items to combinations of a user-specific purchase history, a group purchase history, and/or others as described in FIG. 8.

Returning to the flow chart 600 of FIG. 6, execution of the query 620 (using the parameters 615) returns a set of linked items 635 that are identified as a result of those items being linked (as shown by linkage 640) to the item identified by the parameters 615. By way of example, the Organic Bananas may be used in a particular recipe, such as perhaps an ice cream sundae recipe. This recipe may also include vanilla ice cream and strawberries. The linked items 635 may, therefore, include the vanilla ice cream and strawberries. Because the original item may be linked with potentially an innumerable number of other items, the embodiments employ additional intelligence in order to refine or further filter the results of the query, which results are included in the linked items 635. Intelligently filtering items will now be discussed in connection with FIG. 10.

Providing a List of Predicted Items

Figure 10:
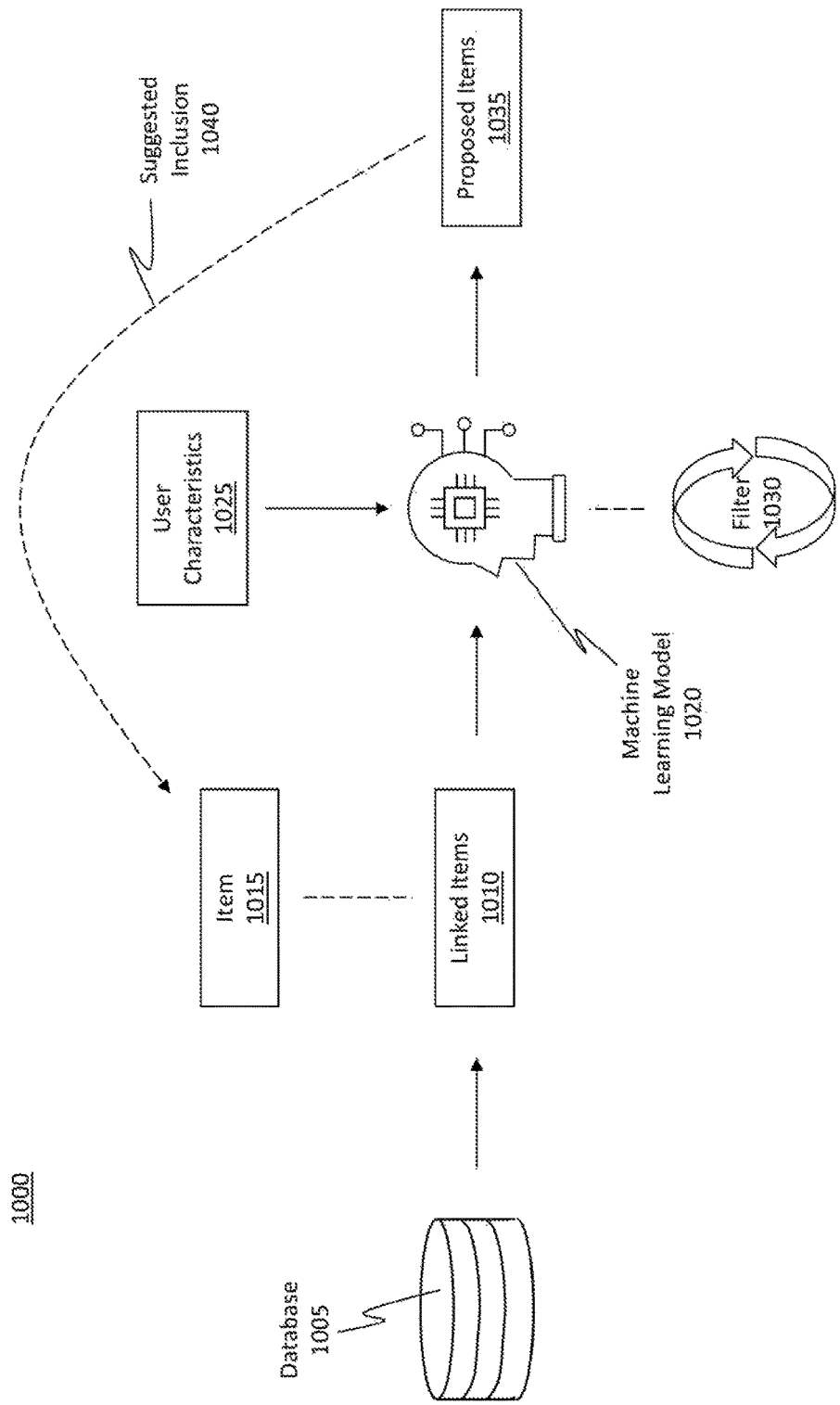
FIG. 10 illustrates how a machine learning model can be used to help select particular items to display to the user as a proposal that those items also be added to the user's electronic shopping cart.

FIG. 10 illustrates flow chart 1000, which is a continuation of the flow chart 600 from FIG. 6. Here, database 1005 is representative of the databases discussed thus far. Notice, the result of the query that was previously executed against the database 1005 produces certain query results, which are listed as linked items 1010. The linked items 1010 share some relationship with the item 1015, which is representative of the item 220 from FIG. 2. As discussed earlier, however, the number of items included in the linked items 1010 may be large, so it is desirable to further refine or filter those items in an intelligent manner so as to generate a list of predicted or proposed items the user is likely going to be adding to his/her electronic shopping cart. Doing so prevents the user from having to search for those items him/herself by entering search terms in the search bar, as was discussed earlier.

To achieve these benefits, the embodiments employ an additional (or perhaps the same model that was used earlier) machine learning model 1020. That is, the linked items 1010 are fed as input into the machine learning model 1020. In addition to the linked items 1010, a set of identified user characteristics 1025 are also fed as input into the machine learning model 1020. The combination of these two inputs enables the machine learning model 1020 to filter 1030 the linked items 1010 in an intelligent manner in order to generate a set of refined proposed items 1035 that are suggested for inclusion (e.g., suggested inclusion 1040) in the user's electronic shopping cart.

In some embodiments, the machine learning model 1020 performs filtering not only based on the linked items 1010 and the user characteristics 1025 but also on an understanding of what items constitute so-called "staple" items. For instance, in the context of food-related products, items such as bread and milk are often considered "staple" foods. The embodiments are able to determine whether a food product is a staple food (e.g., perhaps because the item is tagged as a "staple" item within the database or perhaps metadata of the item identifies it as being a staple or perhaps an Internet search of the item lists it as being a staple item) and then factor that identification into its prediction making process. If multiple items have been added to the electronic shopping cart and if one or more of those items are staple foods, the machine learning model 1020 is able to either consider or not consider the staple items when making its proposal. For instance, it may be the case that the user is preparing a pizza and thus is buying pizza ingredients. It may also be the case that the user needs milk at his/her house. As such, the user may have added some pizza-preparing items into the shopping cart and may also have added milk to the shopping cart. The embodiments are able to identify the pizza and then potentially refrain from factoring the milk item when identifying other linked items used to generate the proposal. Accordingly, some embodiments are able to selectively filter items from consideration in the proposal, where the selective filtering is based on underlying characteristics (e.g., staple items) associated with those items.

Figure 11:
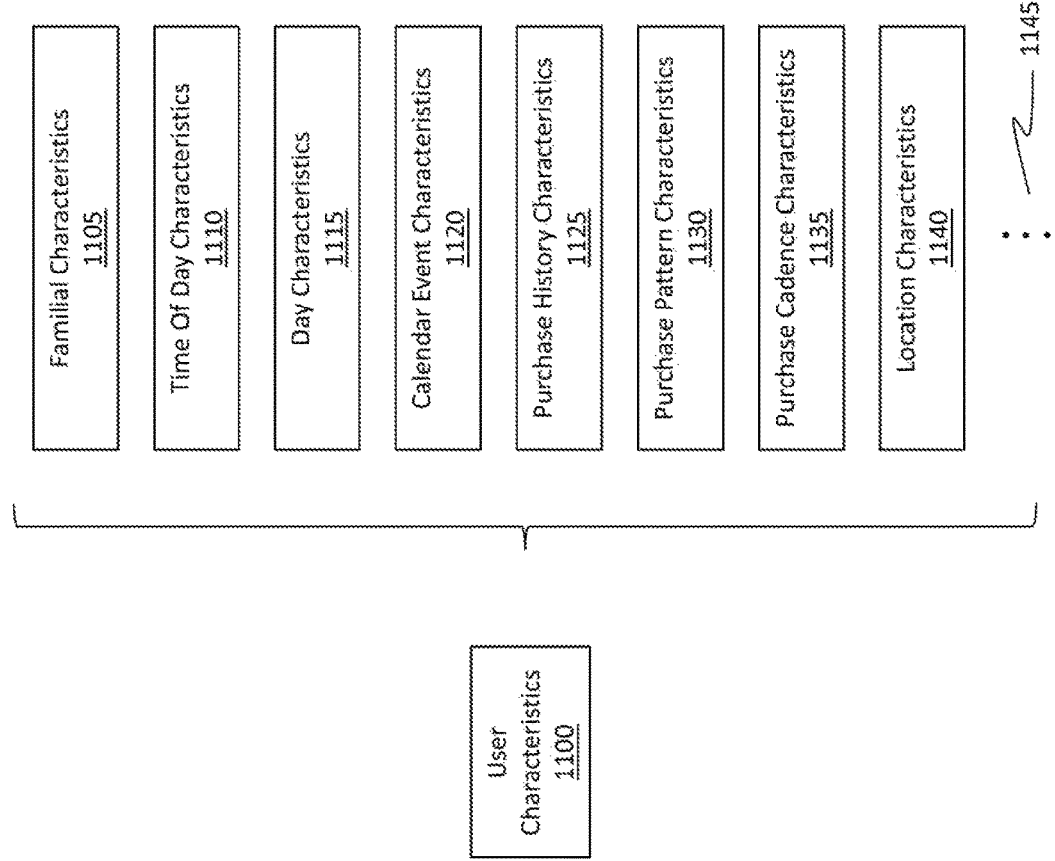
FIG. 11 illustrates a list of user characteristics that may be considered when determining which proposed items are to be displayed for the user's consideration.

With regard to the user characteristics 1025, FIG. 11 provides additional clarification. User characteristics 1100, which are representative of user characteristics 1025 from FIG. 10, include any type of characteristic of a user.

By way of example, user characteristics 1100 may identify familial characteristics 1105 of the user. Familial characteristics 1105 include any family member of the user, where the term "family" is an encompassing and expansive term. As an example, suppose the user has an infant. Because the user added organic bananas to his/her electronic shopping cart and because the embodiments are able to detect the user's familial characteristics 1105, the embodiments can make a prediction that the user is going to make baby food from the organic bananas. Baby food often has other fruits, oats, or perhaps crisped rice. Based on the identified user characteristics 1100, therefore, the embodiments are able to filter the list of linked items, which would have included the other fruits, oats, and crisped rice, to include recipes for baby food (where the recipes use organic bananas or where the recipes are other/additional baby food recipes that do not necessarily use bananas but that are still deemed potential options as a result of the system predicting the user is making multiple different types of baby food). The embodiments then provide the ingredients or items included within those baby food recipes as a set of proposed items for inclusion in the user's electronic shopping cart. Accordingly, any type of familial characteristic may be used to facilitate the machine learning model in filtering the list of linked items in order to predict which items the user desires to add to his/her shopping cart.

Another example of a user characteristic is time of day characteristics 1110. For instance, the embodiments are able to track and monitor when a user adds certain items to his/her electronic shopping cart. Based on this information, the machine learning model can then filter the results. An example will be helpful. Suppose the embodiments have detected that the user periodically uses a food delivery service at 11:00 pm. The user often has a burger, drink, and fries. When the user adds the burger to the shopping cart at or around 11:00 pm, then the embodiments can discern or predict that the user will also likely want to add the drink and fries. As such, the machine learning model can provide those items as options for inclusion in the shopping cart.

The day characteristics 1115 are somewhat similar to the time of day characteristics 1110 with the exception that the time of day characteristics 1110 may be more granular and time based whereas the day characteristics 1115 may be based on a high level day-based purchasing pattern. For instance, with the baby/infant example from earlier, it may be the case that the user purchases organic bananas every three days. If the three-day period has arrived, then the embodiments may provide the other baby food ingredients as options for inclusion in the user's electronic shopping cart.

The embodiments are also able to search a user's calendar to identify scheduled upcoming events and link items based on those events, as reflected by the calendar event characteristics 1120. For instance, suppose a user has a calendar connected or associated with his/her email account (e.g., personal, business, etc.) or some other user account. The embodiments are able to search that calendar to determine whether the user will be engaged in any upcoming activities within a predetermined period of time (e.g., perhaps the current day, the next day, or a selected number of days in the future). By analyzing the user's current shopping cart and by analyzing the user's calendar, the embodiments are able to deduce, derive, or predict that the user will likely be adding certain other items to his/her shopping cart.

By way of example, suppose the user has currently added dough to his/her shopping cart. Further suppose the user is a parent of a child, and the user's calendar lists the name of a person whose birthday is the next day. The embodiments are able to identify the person's name and determine that the person is the user's child, based on the familial characteristics 1105. Furthermore, the embodiments are able to recognize a birthday as being included in the calendar event characteristics 1120. Based on these pieces of information and further based on a determination that dough is included in a pizza recipe, the embodiments are able to predict that the user is likely going to be making a pizza for the child's birthday party. In response to this determination, the embodiments are able to identify other ingredients or items that are included in the pizza recipe and submit those other items as proposed items for inclusion in the user's shopping cart. Of course, other calendar events may be considered as well.

The user characteristics 1100 can also track or monitor any number of purchase history characteristics 1125. These characteristics refer to items the user has purchased in the past. Additionally, the user characteristics 1100 can monitor or detect purchase pattern characteristics 1130, such as whether or not the user purchases a particular item along with one or more other items. Similarly, the user characteristics 1100 monitors or determines purchase cadence characteristics 1135, which reflect how often a user purchases a particular item. Additionally, the user characteristics 1100 can monitor location characteristics 1140, which refers to the ability to determine at what location a user purchases a particular item.

For instance, it may be the case that the user has a vacation cabin. Every time the user visits this vacation cabin, the user purchases hygienic products (e.g., toilet paper, paper towels, etc.). If the user adds a particular item to his/her shopping cart while at the vacation home, then the embodiments can discern that the user will likely desire other products as a result of the user's current location. The ellipsis 1145 represents how other user characteristics or associations may be made, without limit.

Accordingly, the embodiments are able to identify any number of linked items that share a connection or correlation with an item in the user's shopping cart. Either before, in parallel with, or subsequent to those linked items being determined, the embodiments are able to determine any number of user characteristics. These user characteristics are fed as input into a machine learning model to help the model filter and refine the linked items to determine which items are likely desired by the user at this current point in time based on the user's current shopping cart and based on the user's current situation, circumstance, or characteristics.

Figure 12:
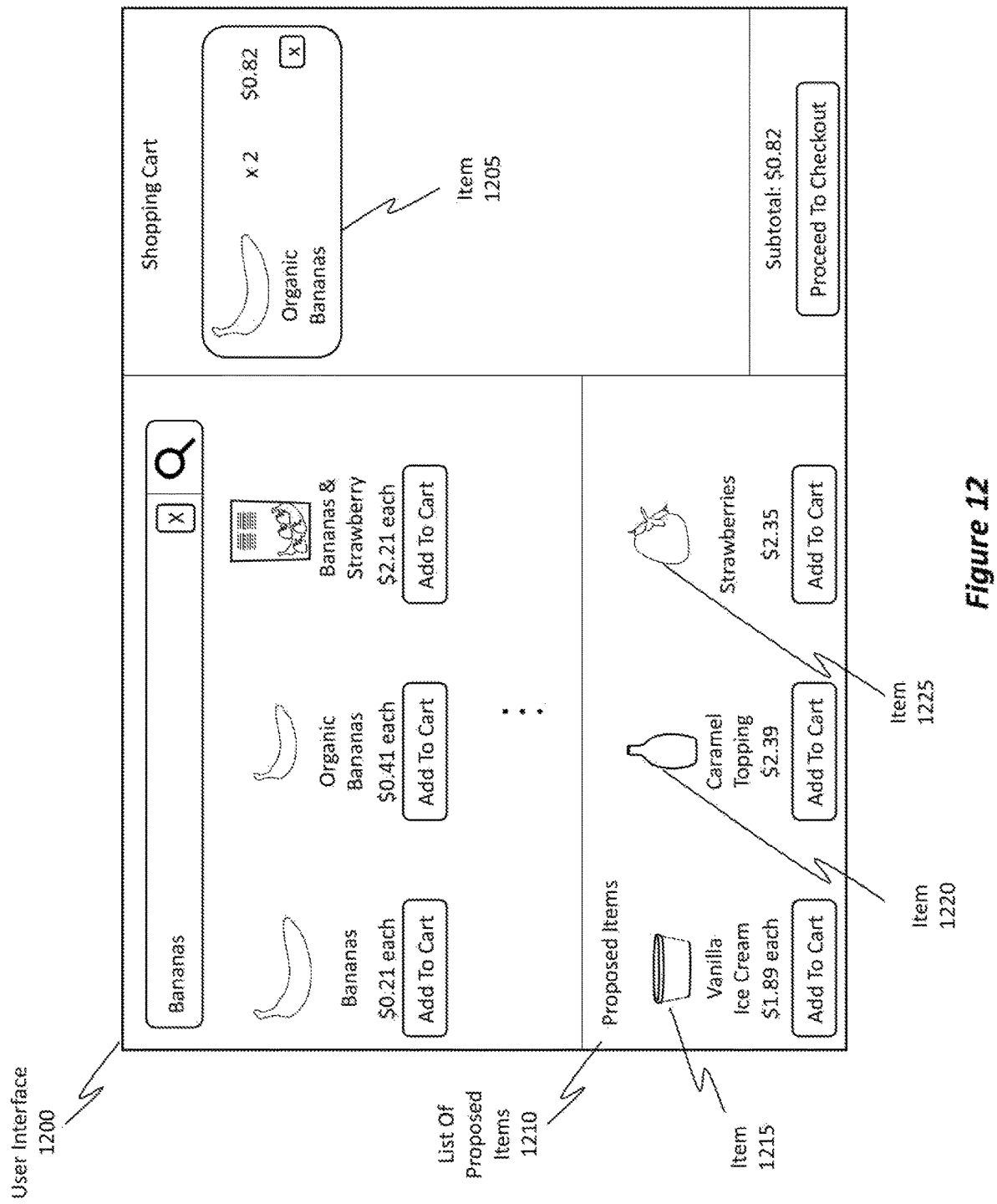
FIG. 12 illustrates an example user interface showing a list of proposed items that can be added to the user's electronic shopping cart, where these items were intelligently selected based on identified links to items already in the user's cart as well as characteristics associated with the user.

FIG. 12 shows the resulting user interface 1200 that is presented in response to an item 1205 being added to the user's electronic shopping cart. Here, the item 1205 was initially subjected to the flow chart 600 of FIG. 6 and the flow chart 1000 of FIG. 10 in order to predict a set of items that the user potentially desires. For instance, the user interface 1200 is shown as displaying a list of proposed items 1210 that includes item 1215, item 1220, and item 1225. In this particular scenario, the embodiments determined or predicted the user is likely going to follow a recipe the makes an ice cream sundae. Based on past purchase histories and/or other preferences of the user (as determined by the linked items and/or the user characteristics), the embodiments determined that items 1215, 1220, and 1225 (i.e. vanilla ice cream, caramel topping, and strawberries, respectively) are likely the items the user will search for next in the user interface 1200 for inclusion in the shopping cart. Consequently, those items are displayed without requiring the user to enter a new search term in the search bar of the user interface 1200. Instead, these items are unilaterally displayed based on the prediction engine or prediction operations performed by the disclosed embodiments.

In some cases, the embodiments generate a list of multiple proposed items. The embodiments may also rank, weight, or assign a priority to each one of these proposed items based on a computed probability or likelihood that the user is actually desirous of this item. That is, a confidence level or indication may be computed and attached to each item, where the confidence reflects a computed likelihood that the machine learning model accurately predicts the user will desire this particular item. The items in the list may then be stack ranked based on the confidence levels, where higher confidence items are listed above lower confidence items. Feedback may be provided to the machine learning model to perpetually learn over time and improve the prediction algorithm.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 13A:
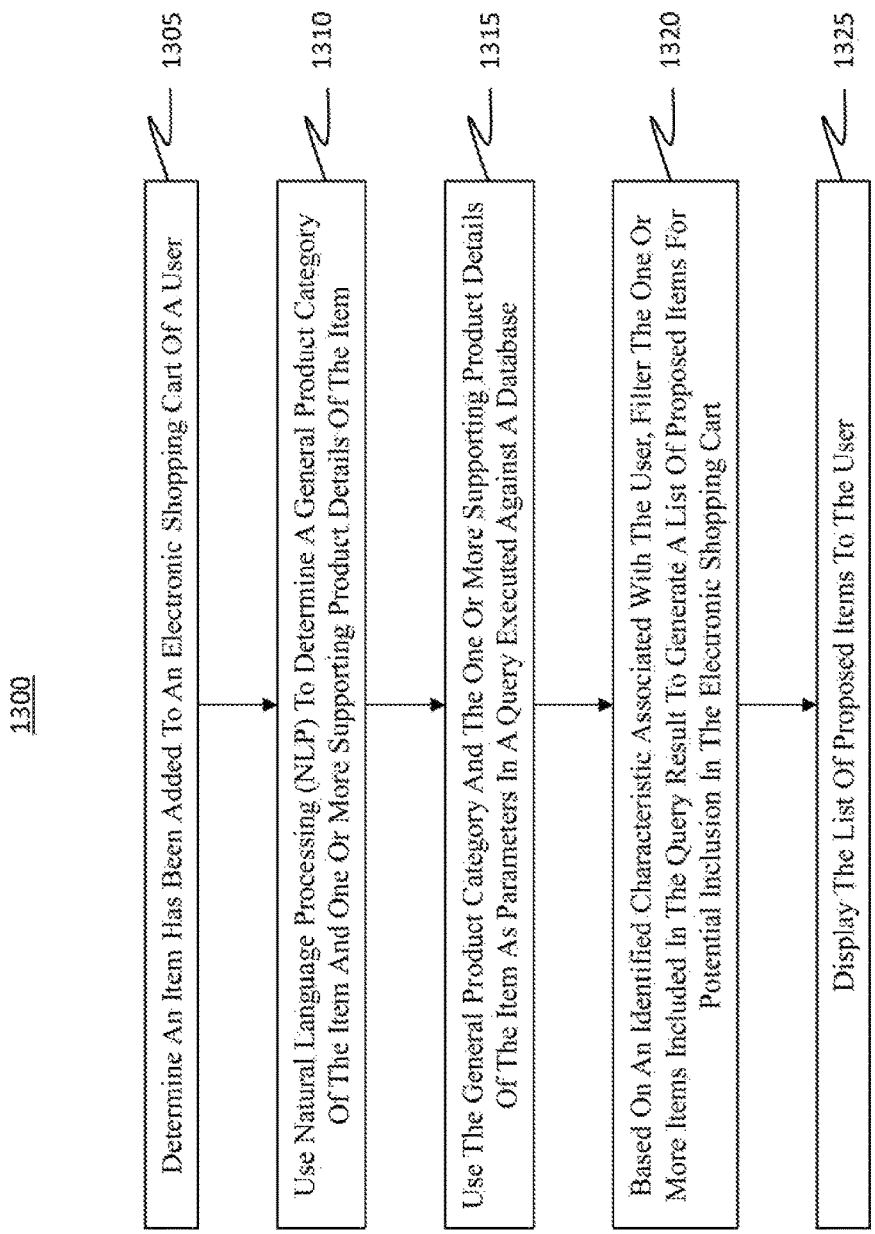
FIGS. 13A and 13B illustrate a flowchart of an example method for intelligently predicting which items a user will add to an electronic shopping cart.

FIG. 13A illustrates a flowchart of an example method 1300 for intelligently predicting which items a user will add to an electronic shopping cart. Method 1300 may be performed within the architecture 100 of FIG. 1 (e.g., by a client application executing on a mobile device and/or by the server application executing in the cloud) and by following the operations discussed in FIGS. 2 through 12.

Initially, method 1300 includes an act (act 1305) of determining an item has been added to an electronic shopping cart of a user. For instance, using the user interface 200 of FIG. 2, the embodiments are able to detect a situation or condition in which an item (e.g., item 220) has been added to a shopping cart (e.g., shopping cart 215).

Natural language processing (NLP) is then used (act 1310) to determine a general product category of the item and one or more supporting product details of the item. To illustrate, the NLP 310 from FIG. 3 is able to analyze the shopping cart as well as other content associated with an item in a shopping cart (e.g., perhaps the item's corresponding webpage) to parse text, images, or other content to determine the item's general product category 320 and supporting product details 325.

In act 1315, there is a step of using the general product category and the one or more supporting product details of the item as parameters in a query executed against a database. For instance, FIG. 6 shows how the general product category 605 and the supporting product details 610 are formatted as parameters 615 of a query 620 that is then executed against the database 625. Here, the database links the item to one or more other items based on shared characteristics between the item and the one or more other items, as was described in detail in FIG. 7. Furthermore, a result of the query identifies the one or more items linked to the item, such as the linked items 635 from FIG. 6. In some cases, the database includes a user-specific purchase history detailing previous purchases made by the user and a group purchase history detailing previous purchases made by a group of users. In some cases, the query is executed against both the user-specific purchase history and the group purchase history.

Based on an identified characteristic associated with the user, there is then an act (act 1320) of filtering the one or more items included in the query result to generate a list of proposed items for potential inclusion in the electronic shopping cart. For instance, the machine learning model 1020 of FIG. 10 is able to receive, as input, user characteristics 1025 as well as the linked items 1010 and possibly even the item 1015 itself in order to intelligently filter the linked items 1010 to generate a set of proposed items 1035.

Method 1300 also includes an act (act 1325) of displaying the list of proposed items to the user. For instance, the list of proposed items 1210 from FIG. 12 is representative of method act 1325.

The embodiments are not limited to operating using only a single item in the user's electronic shopping cart. For instance, when a user adds additional items to his/her shopping cart, those additional items can be used to help improve the machine learning model's prediction as to the reason why the user is adding items to his/her shopping cart. In this regard, additional refinement to the list of proposed items may be made as the user adds more items to his/her shopping cart. Such additional refinement is shown by the method acts illustrated in FIG. 13B.

Figure 13B:
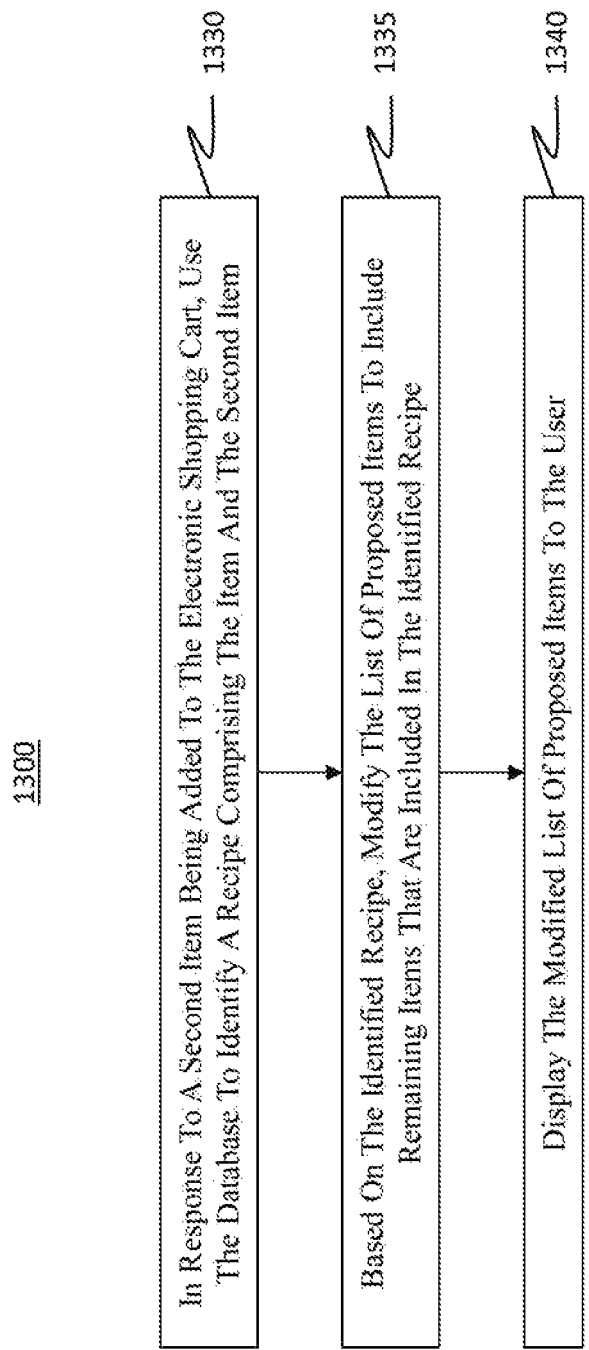

FIG. 13B illustrates a continuation of method 1300 from FIG. 13A. For instance, in response to a second item being added to the electronic shopping cart, there is an act (act 1330) of using the database to identify a recipe or other relationship comprising the item and the second item.

Figure 14:
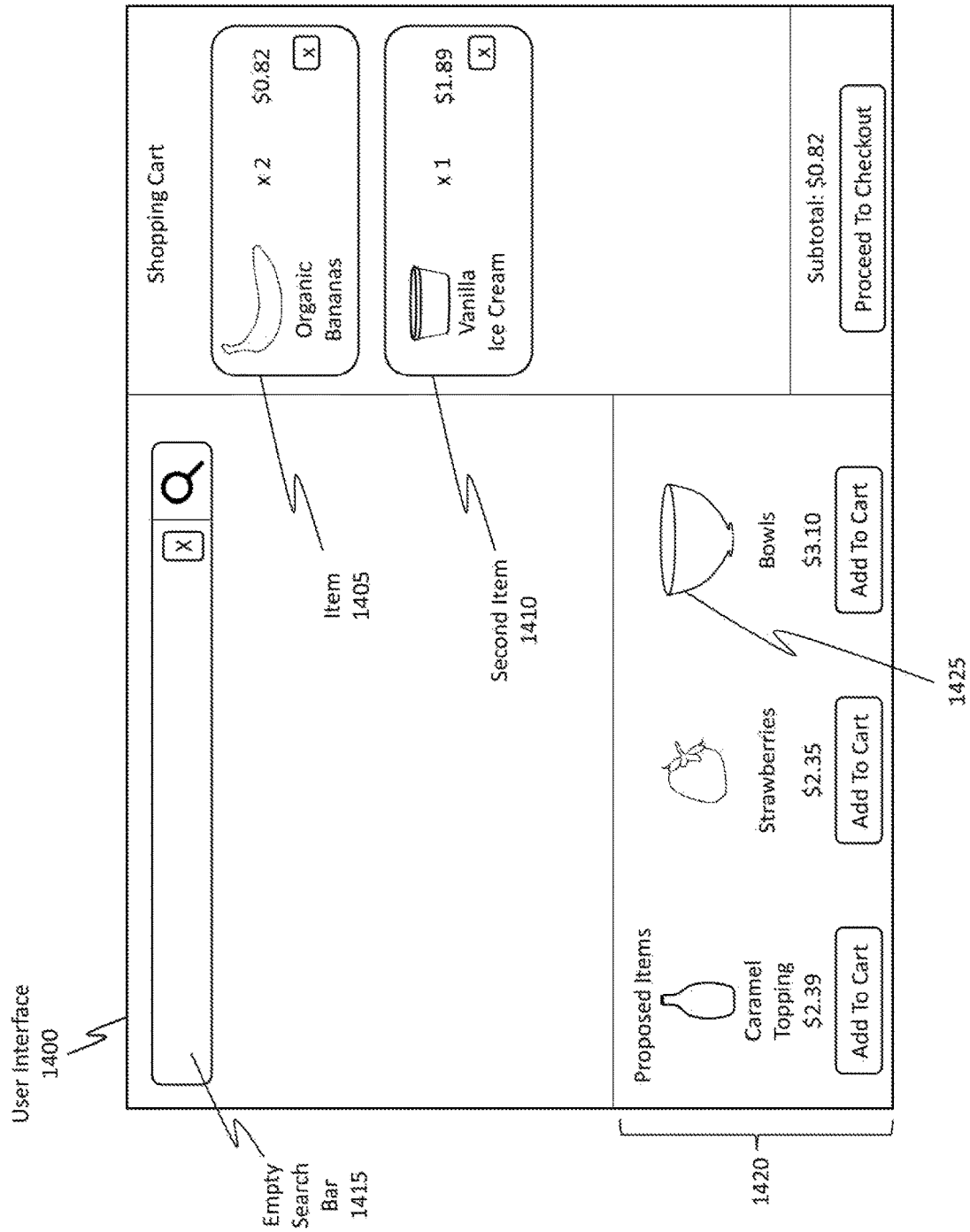
FIG. 14 illustrates how the list of proposed items may be modified in response to additional items being added to the user's electronic shopping cart.

Based on the identified recipe (or other relationship), there is an act (act 1335) of modifying the list of proposed items to include remaining items that are included in the identified recipe (or other relationship). Then, act 1340 includes displaying the modified list of proposed items to the user. FIG. 14 is representative of these additional method acts.

In some implementations, the user product selection flow is as shown if act 1305 were to connect to act 1315 directly (bypassing act 1310). The user search selection flow is as shown if instead of act 1305, there is a module where a user queries the system and then goes directly to act 1310 (bypassing act 1305). One example process takes in product inventory, transaction history (and other data) and then performs the ingestion and categorization to map the product to the general product category (identified in act 1310) and the identified characteristic associated with the user (identified in act 1320).

Accordingly, in some cases, there may be different distinct flows, including: an ingestion flow, a search flow, and a selection flow, as generally described above. In the ingestion flow, a merchandiser will provide inventory data and transaction history inventory data. This data is then categorized via the core AI engine. The transaction data may be clustered in a variety of ways for personalization. In this regard, the store's data may be modeled and tracked. For instance, the embodiments are able to monitor items based on the store's own inventory, including how those items are related to one another. The store modelling operations are generally focused on the store's inventory, the store's shelves, how to sell items, and even the relationship with the consumer. A consumer model tracks the likes and interests of consumers. Similarly, a product model refers to how products relate to commodities and how they are used (e.g., recipes, this type of category is related to another category, or they are used together). In the search flow, a user searches for products. Here, NLP is used to interpret and search. For instance, the categorized inventory is searched against the system's interpretation of the user's input. Personalization from past transactions and current cart selection is applied in the selection flow. For instance, the user can select items for cart personalization from past transactions and current cart is applied.

FIG. 14 shows an example user interface 1400, which is representative of the user interfaces discussed thus far. Here, an item 1405 was previously added to the user's shopping cart. Additionally, the user has added a new or second item 1410 to his/her cart (e.g., vanilla ice cream). In response to this new item being added to the shopping cart, the embodiments are able to better or more granularly filter the list of linked items in order to make a prediction regarding other items the user would like to add to his/her cart. Such operations can be performed even when the user has not yet entered any new search terms into the user interface's search bar, as reflected by the empty search bar 1415.

For instance, based on the combination of item 1405 and the second item 1410, the embodiments now have more parameters to use in a query against the database. Use of more parameters enables the system to better identify recipes or other relationships that those items might share. In this case, the embodiments determined the user is likely going to prepare or make an ice cream sundae. Consequently, the embodiments generated the list 1420 of proposed items. Notice, the list 1420 is different from the list of proposed items 1210 from FIG. 12 because the embodiments now have additional information to work with (e.g., the combination of item 1405 and second item 1410). In this particular scenario, the embodiments additionally determined that item 1425 is related to the items in the user's shopping cart, and thus this newly proposed item is added to the list 1420.

Accordingly, in some embodiments, in response to a second item being added to the electronic shopping cart, the embodiments are able to predict a recipe for which a first item and the second item are being purchased. The embodiments are also able to modify the list of proposed items to include remaining items that are included in the predicted recipe.

It should be noted how the embodiments are also able to communicate with any number of smart devices or Internet-of-Things (IoT) devices. For instance, suppose the user has a smart refrigerator that is able to track which items are currently in the refrigerator. The embodiments are able to communicate with this smart device when generating their predictions. By way of example, suppose the smart refrigerator identifies that caramel topping is currently in the refrigerator. Based on that determination, the embodiments can predict that the user likely will not purchase new caramel topping because he/she already has some. As such, communication with IoT smart devices can help the machine learning model generate its prediction. Communication with smart IoT devices owned or used by the user may be another so-called "user characteristic" that is fed as input to the machine learning model.

Accordingly, the disclosed embodiments are able to generate and display predictions regarding which items the user will likely add to his/her electronic shopping cart. In some cases, the embodiments are able to trigger the generation of these predictions even before the user has entered anything in his/her cart and even before the user has entered any search terms. For instance, if it is determined the user periodically orders a burger, fries, and a drink at 11:00 pm on Monday nights, the embodiments can display those proposed items once the user interface is displayed and without the user even having to enter any search terms in a search bar.

In some embodiments, the disclosed system is able to provide several different options to users. For instance, some of the options include: (1) from a consumer's/user's own past order history provide "would you like to purchase again" options, (2) using multiple consumer's order history combined with a product X selection provide "others who have purchased X have also purchased . . . ", and (3) using the consumer's own past history, along with multiple consumer's order history, applying deep food/item relationship knowledge to provide "given your taste preferences, you may also like" options.

In addition to these options, the disclosed embodiments may also analyze a likelihood of a consumer being interested in a product. For example, if the user has recently purchased product X, then product X is filtered out of set of recommendation options; conversely, if a favorite product has not been purchased in a determined normal, routine, or periodic purchase timeframe, the likelihood is greater that the user is ready to purchase the item again.

Patterns from many users' histories from many stores may be compiled along with public and aggregated data sources to provide a far richer set of patterns than can be extracted from any single source. Recommendations generated from these patterns are matched against a store's inventory. If not directly found, substitutable products that are in the inventory may also presented. In this regard, the embodiments are able to analyze a product's details and determine whether the item is currently available. If the item is not currently available, the system is able to intelligently propose a substitute item having characteristics that closely match (e.g., match to a threshold level or degree) the originally desired item.

The disclosed embodiments are able to examine a user's history for patterns, such as dietary restrictions, food preference patterns, household makeup, etc. These patterns factor in significantly to the personalization aspects (i.e. personas). For example, a mother that orders for the family with young children will often consider at least the following: the types of food, the quantities, the qualities, the pricing, the nutrition, and even the preferences for food origins. All of these factors may impact the mother's buying decision. These factors are considered "user characteristics" (e.g., user characteristics 1025 from FIG. 10 and user characteristics 1100 from FIG. 11) and thus are factored into the recommendations/proposals/predictions.

Given the patterns of food or other types of items (not just products) that a consumer prefers, the disclosed embodiments may recommend other foods or items that the user may have never ordered based on their identified preferences. Additionally, as a consumer selects items to place in his/her online shopping cart, the embodiments are able to identify recommendations by looking across the patterns of how the combination of those products are used (e.g., in recipes).

Example Computer/Computer Systems

Attention will now be directed to FIG. 15 which illustrates an example computer system 1500 that may include and/or be used to perform any of the operations described herein. Computer system 1500 may take various different forms. For example, computer system 1500 may be embodied as a tablet (1500A), a desktop or laptop (1500B), a wearable device (1500C), a mobile device, a standalone device, or any other device, as reflected by the ellipsis 1500D. Computer system 1500 may also be a distributed system that includes one or more connected computing components/devices that are in communication with computer system 1500.

In its most basic configuration, computer system 1500 includes various different components. FIG. 15 shows that computer system 1500 includes one or more processor(s) 1505 (aka a "hardware processing unit"), a machine learning model 1510, and storage 1520.

Regarding the processor(s) 1505, it will be appreciated that the functionality described herein can be performed, at least in part, by one or more hardware logic components (e.g., the processor(s) 1505). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

The machine learning model 1510 may be any of the machine learning models discussed herein and may be implemented as a specific processing unit (e.g., a dedicated processing unit as described earlier) configured to perform one or more specialized operations for the computer system 1500. As used herein, the terms "executable module," "executable component," "component," "module," "model," or "engine" can refer to hardware processing units or to software objects, routines, or methods that may be executed on computer system 1500. The different components, modules, engines, and services described herein may be implemented as objects or processors that execute on computer system 1500 (e.g. as separate threads). The machine learning model 1510 (or perhaps even just the processor(s) 1505) can be configured to perform any of the disclosed method acts or other functionalities.

Storage 1520 may be physical system memory, which may be volatile, non-volatile, or some combination of the two. The term "memory" may also be used herein to refer to non-volatile mass storage such as physical storage media. If computer system 1500 is distributed, the processing, memory, and/or storage capability may be distributed as well.

Storage 1520 is shown as including executable instructions 1525. The executable instructions 1525 represent instructions that are executable by the processor(s) 1505 (or perhaps even the machine learning model 1510) of computer system 1500 to perform the disclosed operations, such as those described in the various methods.

The disclosed embodiments may comprise or utilize a special-purpose or general-purpose computer including computer hardware, such as, for example, one or more processors (such as processor(s) 1505) and system memory (such as storage 1520), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1500 may also be connected (via a wired or wireless connection) to external sensors (e.g., one or more remote IoT device) or other devices via a network 1530. For example, computer system 1500 can communicate with any number devices or cloud services (e.g., server application 120 from FIG. 1) to obtain or process data. In some cases, network 1530 may itself be a cloud network. Furthermore, computer system 1500 may also be connected through one or more wired or wireless networks 1530 to remote/separate computer systems(s) that are configured to perform any of the processing described with regard to computer system 1500.

A "network," like network 1530, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1500 will include one or more communication channels that are used to communicate with the network 1530. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processors; and
one or more computer-readable hardware storage devices that store instructions that are executable by the one or more processors to cause the computer system to at least:
receive, at a server application executing in a cloud computing environment, data indicating that an item has been added to an electronic shopping cart of a user;
identify, at the server application, a uniform resource locator (URL) associated with the item and transmit the URL to a web crawler module stored in the hardware storage device of the server application;
execute, at the server application, a web crawling operation using the web crawler module to access and retrieve content from a webpage identified by the URL;
execute, at the server application, the retrieved content using an optical character recognition (OCR) algorithm stored in the hardware storage device of the server application to extract text and image-based information from the webpage;
execute, at the server application, a natural language processing (NLP) algorithm to perform word segmentation, morphological analysis, and syntactic analysis on the extracted text to identify words describing the item, wherein identifying the words describing the item further comprises:
determining, at the server application, a general product category of the item, and
determining, at the server application, one or more supporting product details of the item;
store, in a database coupled to the server application, the general product category and the one or more supporting product details of the item;
execute, at the server application, a query a database using the general product category and the one or more supporting product details of the item as parameters, wherein the database links the item to one or more other items based on shared characteristics between the item and the one or more other items, and wherein a result of the query identifies the one or more other items linked to the item;
retrieve, from a user-specific data repository stored on a hardware storage device associated with the server application, user characteristic data including a digital calendar associated with the user;
analyze, at the server application, the digital calendar to identify one or more scheduled upcoming events associated with the user to generate an identified characteristic associated with the user;
apply, at the server application, the identified characteristic associated as a filter to the one or more other items included in the query result to generate a list of proposed items for potential inclusion in the electronic shopping cart, wherein the list of proposed items includes items that are related to the one or more scheduled upcoming events;
transmit, from the server application to a client application executing on a mobile device, the list of proposed items for display on the mobile device;
in response to detecting, at the server application, that a second item has been added to the electronic shopping cart, execute a second query against the database to identify a recipe for which the item and the second item are linked;
in response to the identification of the recipe, modify, at the server application, the list of proposed items to include remaining items that are included in the identified recipe; and
transmit, from the server application to the client application, the modified list of proposed items for display on the mobile device.

2. The computer system of claim 1, wherein the database includes a user-specific purchase history for the user, and wherein the shared characteristics between the item and the one or more other items is an identification that the item was previously purchased at a same time as the one or more other items.

3. The computer system of claim 1, wherein the shared characteristics between the item and the one or more other items is an identification that the item and the one or more other items are both ingredients in a same recipe.

4. The computer system of claim 1, wherein the database includes a group purchase history detailing purchases previously made by a group of users, and wherein the shared characteristics between the item and the one or more other items is an identification that the item and the one or more other items were previously purchased together by a threshold number of users included in the group of users, as detailed by the group purchase history.

5. The computer system of claim 1, wherein the one or more supporting product details of the item includes an amount of the item that has been added to the electronic shopping cart.

6. The computer system of claim 1, wherein the one or more supporting product details of the item includes a manufacturer of the item or, alternatively, includes a granular type of the item within the general product category.

7. The computer system of claim 1, wherein the database links the item to the one or more other items based on one or more of: a common recipe listing the item and the one or more other items, a nutrient correlation between the item and the one or more other items, or a proximity of the item to the one or more other items within a physical store.

8. A method for intelligently predicting which items a user will add to an electronic shopping cart, said method comprising:
  receiving, at a server application executing in a cloud computing environment, data indicating that an item has been added to an electronic shopping cart of a user;
  identifying, at the server application, a uniform resource locator (URL) associated with the item and transmit the URL to a web crawler module stored in a hardware storage device of the server application;
  executing, at the server application, a web crawling operation using the web crawler module to access and retrieve content from a webpage identified by the URL;
  executing, at the server application, the retrieved content using an optical character recognition (OCR) algorithm stored in the hardware storage device of the server application to extract text and image-based information from in the webpage;
  executing, at the server application, a natural language processing (NLP) algorithm to perform word segmentation, morphological analysis, and syntactic analysis on the extracted text to identify words describing the item, wherein identifying the words describing the item further comprises:
    determining, at the server application, a general product category of the item, and
    determining, at the server application, one or more supporting product details of the item;
  storing, in a database coupled to the server application, the general product category and the one or more supporting product details of the item;
  executing, at the server application, a query against the database using the general product category and the one or more supporting product details of the item as parameters, wherein the database links the item to one or more other items based on shared characteristics between the item and the one or more other items, and wherein a result of the query identifies the one or more other items linked to the item;
  retrieving, from a user-specific data repository stored on a hardware storage device associated with the server application, user characteristic data including a digital calendar associated with the user;
  analyzing, at the server application, the digital calendar to identify one or more scheduled upcoming events associated with the user to generate an identified characteristic associated with the user;
  applying, at the server application, the identified characteristic associated with as a filter to the one or more other items included in the query result to generate a list of proposed items for potential inclusion in the electronic shopping cart, wherein the list of proposed items includes items that are related to the one or more scheduled upcoming events;
  in response to detecting, at the server application, that a second item has been added to the electronic shopping cart, executing a second query against the database to identify a recipe for which the item and the second item are linked;
  in response to the identification of the recipe, modify, at the server application, the list of proposed items to include remaining items that are included in the identified recipe; and
  transmit, from the server application to the client application, the modified list of proposed items for display on the mobile device.

9. The method of claim 8, wherein the identified characteristic associated with the user is an identified purchase pattern of the user.

10. The method of claim 8, wherein the database refrains from linking the item to the one or more other items based on relationships between uniform resource locators (URLs) of the item and the one or more other items.

11. The method of claim 8, wherein the database includes a user-specific purchase history detailing previous purchases made by the user and a group purchase history detailing previous purchases made by a group of users, and wherein the query is executed against both the user-specific purchase history and the group purchase history.

12. The method of claim 8, wherein the method is performed by a client application executing on a mobile device of the user.

13. The method of claim 8, wherein the database includes a plurality of recipes grouping different items together, and wherein the item is linked to multiple different recipes within the database.

* * * * *